United States Patent
Ohashi et al.

(10) Patent No.: US 11,427,724 B2
(45) Date of Patent: Aug. 30, 2022

(54) PIGMENT PRINTING INK JET INK COMPOSITION AND PIGMENT PRINTING INK JET RECORDING METHOD

(71) Applicant: SEIKO EPSON CORPORATION, Tokyo (JP)

(72) Inventors: Masakazu Ohashi, Shiojiri (JP); Kosuke Chidate, Shiojiri (JP); Toshiyuki Miyabayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 16/363,123

(22) Filed: Mar. 25, 2019

(65) Prior Publication Data
US 2019/0292388 A1 Sep. 26, 2019

(30) Foreign Application Priority Data
Mar. 26, 2018 (JP) .............................. JP2018-057899

(51) Int. Cl.
*C09D 11/36* (2014.01)
*B41M 5/00* (2006.01)
(Continued)

(52) U.S. Cl.
CPC ........... *C09D 11/36* (2013.01); *B41M 5/0023* (2013.01); *B41M 5/0047* (2013.01);
(Continued)

(58) Field of Classification Search
CPC ....... C09D 11/36; C09D 11/38; C09D 11/107; C09D 11/102; C09D 11/322;
(Continued)

(56) References Cited

U.S. PATENT DOCUMENTS

2010/0028625 A1* 2/2010 Kagata ................ C09D 11/326
428/195.1
2012/0262517 A1 10/2012 Takaku et al.
(Continued)

FOREIGN PATENT DOCUMENTS

JP 2012-224658 A 11/2012
JP 2017-019972 A 1/2017
(Continued)

OTHER PUBLICATIONS

Database WPI, Week 201804, 2017, Thomson Scientific, London, GB; AN 2017-89925K, XP002792366.
(Continued)

*Primary Examiner* — Alexander C Kollias
(74) *Attorney, Agent, or Firm* — Oliff PLC

(57) ABSTRACT

A pigment printing ink jet ink composition includes a pigment, a resin particle, an organic solvent, and water. The organic solvent includes an amide compound represented by the following general formula (1).

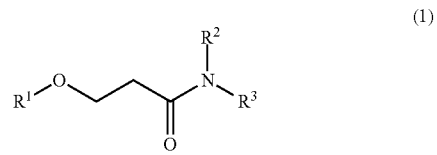

(1)

In the general formula (1), $R^1$ represents a straight chain or branched alkyl group having 1 to 6 carbon atoms, and $R^2$ and $R^3$ each independently present hydrogen atoms or a straight chain or branched alkyl group having 1 to 4 carbon atoms.

10 Claims, 1 Drawing Sheet

(51) Int. Cl.
*C09D 11/102* (2014.01)
*C09D 11/322* (2014.01)
*C09D 11/38* (2014.01)
*D06P 5/30* (2006.01)
*C09D 11/107* (2014.01)
*D06P 5/22* (2006.01)
*D06P 5/00* (2006.01)

(52) U.S. Cl.
CPC .......... *C09D 11/102* (2013.01); *C09D 11/107* (2013.01); *C09D 11/322* (2013.01); *C09D 11/38* (2013.01); *D06P 5/002* (2013.01); *D06P 5/22* (2013.01); *D06P 5/30* (2013.01)

(58) Field of Classification Search
CPC ....... C09D 11/324; C09D 11/033; D06P 5/30; D06P 5/22; D06P 5/002; D06P 1/5285; D06P 3/52; D06P 1/525; D06P 3/60; B41M 5/0023; B41M 5/0047
See application file for complete search history.

(56) References Cited

U.S. PATENT DOCUMENTS

| | | | |
|---|---|---|---|
| 2013/0286117 A1* | 10/2013 | Sao | B41J 2/2107 347/100 |
| 2014/0240399 A1 | 8/2014 | Saito et al. | |
| 2015/0015639 A1* | 1/2015 | Ito | B41M 7/0018 347/21 |
| 2016/0376455 A1 | 12/2016 | Katoh et al. | |
| 2017/0096570 A1* | 4/2017 | Litman | C09D 11/033 |
| 2017/0121543 A1 | 5/2017 | Sakaguchi et al. | |
| 2017/0361632 A1 | 12/2017 | Toyama et al. | |

FOREIGN PATENT DOCUMENTS

| | | |
|---|---|---|
| JP | 2017-51952 A | 3/2017 |
| JP | 2017-226743 A | 12/2017 |

OTHER PUBLICATIONS

Jul. 12, 2019 Search Report issued in European Patent Application No. EP 19165228.8.

* cited by examiner

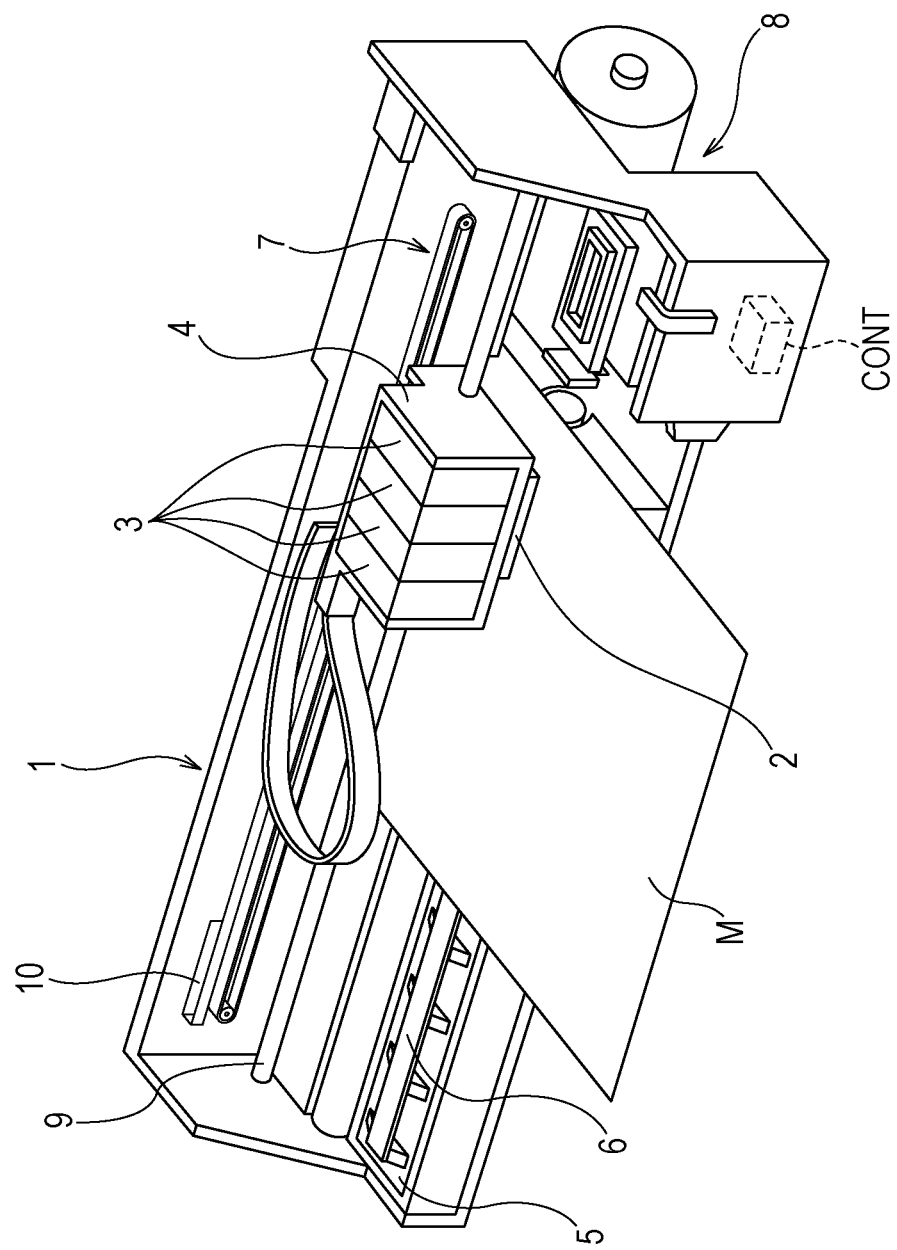

PIGMENT PRINTING INK JET INK COMPOSITION AND PIGMENT PRINTING INK JET RECORDING METHOD

BACKGROUND

1. Technical Field

The present invention relates to a pigment printing ink jet ink composition and a pigment printing ink jet recording method.

2. Related Art

Using an ink jet recording method, printing for dyeing a cloth and the like is performed. In the related art, as a recording method with respect to a cloth such as a woven fabric and a non-woven fabric, a screen printing method, a roller printing method, and the like can be used. However, from a viewpoint of various kinds of small quantity productivity and immediate printability, it is advantageous to apply the ink jet recording method, and thus various examinations are performed.

In printing using the ink jet recording method, an ink composition (hereinafter, referred to as "ink") is mixed with a pigment and a fixing resin to perform printing on a cloth, and the so-called pigment printing ink jet recording method (hereinafter, referred to as "pigment printing") is also examined (for example, JP-A-2017-51952).

SUMMARY

An advantage of some aspects of the invention is that in such a pigment printing ink jet recording method, a pigment printing ink jet ink composition and a pigment printing ink jet recording method that are excellent in color developing properties with respect to various cloths are sought.

Application Example 1

According to an aspect of the invention, there is provided a pigment printing ink jet ink composition including a pigment, a resin particle, an organic solvent, and water, in which the organic solvent includes an amide compound represented by the following general formula (1).

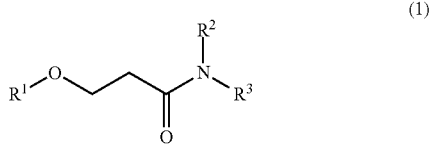

(1)

In the general formula (1), $R^1$ represents a straight chain or branched alkyl group having 1 to 6 carbon atoms, and $R^2$ and $R^3$ each independently represent hydrogen atoms or a straight chain or branched alkyl group having 1 to 4 carbon atoms.

Application Example 2

In the pigment printing ink jet ink composition according to Application Example 1, a content of the amide compound represented by the general formula (1) may be equal to or more than 80% by mass with respect to a total mass of the organic solvent.

Application Example 3

In the pigment printing ink jet ink composition according to Application Example 1 or 2, the resin particle may be a polycarbonate-based urethane resin particle.

Application Example 4

In the pigment printing ink jet ink composition according to any one example of Application Examples 1 to 3, the pigment printing ink jet ink composition may be used in printing onto a polyester cloth.

Application Example 5

In the pigment printing ink jet ink composition according to any one example of Application Examples 1 to 4, a content of the amide compound represented by the general formula (1) may be equal to or more than 16% by mass and equal to or less than 30% by mass with respect to a total mass of the ink composition.

Application Example 6

In the pigment printing ink jet ink composition according to any one example of Application Examples 1 to 5, a content of the amide compound represented by the general formula (1) may be equal to or more than 1.5 at a mass ratio with respect to the resin particle.

Application Example 7

According to another aspect of the invention, there is provided a pigment printing ink jet recording method including ejecting the pigment printing ink jet ink composition according to any one example of Application Examples 1 to 6 from an ink jet nozzle and attaching the composition onto a cloth.

BRIEF DESCRIPTION OF THE DRAWING

The invention will be described with reference to the accompanying drawing, wherein like numbers reference like elements.

FIGURE is an overall perspective view of a printing apparatus performing a pigment printing ink jet recording method according to the embodiment.

DESCRIPTION OF EXEMPLARY EMBODIMENTS

Hereinafter, some embodiments of the invention will be described. The embodiments to be described below are examples of the invention. The invention is not limited to any of the embodiments to be described, and also includes various modifications performed within a range not changing the spirit of the invention. Not all the configurations described below are essential configurations of the invention.

An aspect of a pigment printing ink jet ink composition according to this embodiment includes a pigment, a resin particle, an organic solvent, and water, and the organic solvent includes an amide compound represented by the following general formula (1).

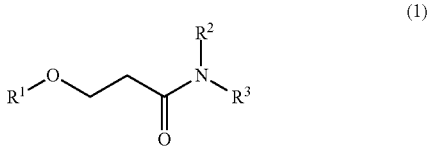

(1)

In the general formula (1), $R^1$ represents a straight chain or branched alkyl group having 1 to 6 carbon atoms, and $R^2$ and $R^3$ each independently present hydrogen atoms or a straight chain or branched alkyl group having 1 to 4 carbon atoms.

In addition, according to another aspect of this embodiment, there is provided a pigment printing ink jet recording method including ejecting the pigment printing ink jet ink composition according to this embodiment from an ink jet nozzle and attaching thereof onto a cloth.

Hereinafter, the pigment printing ink jet ink composition and the pigment printing ink jet recording method according to this embodiment will be described in detail in an order of a configuration of an executable printing apparatus, the pigment printing ink jet ink composition (hereinafter, also referred to as "pigment printing ink", "ink composition", and "ink"), a processing liquid composition that may be used along with the pigment printing ink jet ink composition (hereinafter, also referred to as "processing liquid"), a cloth for performing the pigment printing ink jet recording method, and the pigment printing ink jet recording method.

1. Printing Apparatus

First, an example of a printing apparatus used in this embodiment will be described referring to the drawing. The printing apparatus used in this embodiment is not limited to the following aspect.

In addition, the printing apparatus used in this embodiment will be described by exemplifying an on-carriage type printer in which an ink cartridge is installed in a carriage. The printing apparatus is not limited to the on-carriage type printer. The printing apparatus may be an off-carriage type printer in which an ink cartridge is fixed outside, not being installed in a carriage.

The printer used in the following description is a serial printer in which a print head is installed in a carriage moving in a predetermined direction, and the head moves in accordance with the movement of the carriage to eject liquid droplets on a recording media. The printing apparatus used in the invention is not limited to the serial printer. The printing apparatus may be a line printer in which a head is formed wider than a width of a recording medium and the print head ejects liquid droplets on the recording medium without moving.

In each drawing used in the following description, a size of each member is appropriately changed in order to enlarge the member into a recognizable size.

Examples of the printing apparatus include an ink jet type printer (hereinafter, referred to as "printer") in which an ink jet head shown in FIGURE is installed. As shown in FIGURE, a printer 1 includes a carriage 4 in which an ink jet head 2 is installed and an ink cartridge 3 is detachably mounted, a platen 5 which is provided under the ink jet head 2 and to which a cloth M that is a recording medium is transported, a heating mechanism 6 for heating the cloth M, a carriage moving mechanism 7 which moves the carriage 4 in a medium width direction of the cloth M, and a medium feeding mechanism 8 that transports the cloth M in a medium feeding direction. In addition, the printer 1 includes a control device CONT that controls operation of the whole printer 1. The medium width direction indicates a main scanning direction (hereinafter, head scanning direction). The medium feeding direction indicates a sub-scanning direction (direction perpendicular to the main scanning direction).

The ink jet head 2 is a unit that attaches an ink or a processing liquid onto the cloth M, and includes a plurality of nozzles (not shown) through which an ink is ejected, on a surface opposing the cloth M onto which the ink is attached. The plurality of nozzles is disposed in a line form, and with this, a nozzle face is formed on a nozzle plate surface.

Examples of a method of ejecting an ink from a nozzle include a method of applying a strong electric field between a nozzle and an acceleration electrode in front of the nozzle, continuously ejecting a liquid droplet-like ink from the nozzle, and ejecting the ink corresponding to a recording information signal while the liquid droplets of the ink fly between deflecting electrodes (electrostatic attraction method); a method of forcefully ejecting liquid droplets of an ink by applying a pressure to a processing liquid with a small pump, and mechanically vibrating a nozzle with a crystal vibrator and the like; a method of simultaneously applying a pressure and a recording information signal to an ink with a piezoelectric element, and ejecting and recording liquid droplets of the ink (piezo method); a method of heating and foaming an ink with a minute electrode in accordance with a recording information signal, and ejecting and recording liquid droplets of the ink (thermal jet method), and the like.

As the ink jet head 2, any of a line type ink jet head and a serial type ink jet head is usable, but in this embodiment, the serial type ink jet head is used.

Here, the printing apparatus including a serial type ink jet head performs recording by performing scanning (pass) of ejecting an ink while relatively moving a recording ink jet head with respect to a recording medium a plurality of times. Specific examples of the serial type ink jet head include those in which an ink jet head is installed in a carriage moving in a width direction of a recording medium (direction intersecting transporting direction of recording medium), and the ink jet head moves in accordance with the movement of the carriage to eject liquid droplets on the recording medium.

On the other hand, a printing apparatus including the line type ink jet head performs recording by performing scanning (pass) of ejecting an ink one time while relatively moving an ink jet head with respect to a recording medium. Specific examples of the line type ink jet head include those in which an ink jet head is formed wider than a width of a recording medium and the ink jet head ejects liquid droplets on the recording medium without moving.

The ink cartridge 3 that supplies an ink to the ink jet head 2 includes four ink cartridges. Each of the four cartridges is filled with each of different kinds of inks, for example. The ink cartridge 3 is detachably mounted with respect to the ink jet head 2. In the example of FIGURE, the number of the cartridges is 4 but not limited thereto and it is possible to install a desired number of the cartridges.

The carriage 4 is mounted in a state of being supported by a guide rod 9 which is a support member provided in the main scanning direction. In addition, the carriage 4 moves in the main scanning direction along with the guide rod 9 by the carriage moving mechanism 7. Although the example of FIGURE shows that the carriage 4 moves in the main scanning direction, the carriage 4 is not limited thereto, and may move in the sub-scanning direction, in addition to the movement in the main scanning direction.

An installation position of the heating mechanism 6 is not particularly limited as long as the heating mechanism 6 is provided at a position capable of heating the cloth M. In the example of FIGURE, the heating mechanism 6 is provided at a position opposing the ink jet head 2, on the platen 5. With this, if the heating mechanism 6 is provided at a position opposing the ink jet head 2, it is possible to reliably heat a position onto which liquid droplets are attached in the cloth M, and thus it is possible to effectively dry the liquid droplets attached onto the cloth M.

As the heating mechanism 6, for example, a print heater mechanism of heating the cloth M by bringing the cloth M into contact a heat source, a mechanism of emitting infrared rays or a microwave (electromagnetic wave with a maximum wavelength of about 2,450 MHz), a dryer mechanism of spraying hot air, and the like can be used.

Heating of the cloth M by the heating mechanism 6 is performed before or at the time when liquid droplets ejected from the nozzle of the ink jet head 2 are attached onto the cloth M. All conditions of heating (for example, timing for performing heating, heating temperature, heating time, and the like) are controlled by the control device CONT.

Heating of the cloth M by the heating mechanism 6 is performed such that the cloth M maintains a temperature range of equal to or more than 35° C. and equal to or less than 65° C., from a viewpoint of improvement in spreading, permeability, and dryness of an ink, ejection stability, and the like. Here, the temperature of heating the cloth M means a temperature of a surface of the cloth M on which recording is performed at the time of heating.

The printer 1 may further include a second heating mechanism (not shown) in addition to the heating mechanism 6. In this case, the second heating mechanism is provided downstream in the transporting direction of the cloth M from the heating mechanism 6. The second heating mechanism performs heating of the cloth M after the cloth M is heated by the heating mechanism 6, that is, after liquid droplets ejected from the nozzle are attached onto the cloth M. With this, dryness of the liquid droplets of the ink attached onto the cloth M is improved. As the second heating mechanism, any mechanism described as the heating mechanism 6, for example, the dryer mechanism, a heat press machine, and the like can be used. It is preferable that heating by the second heating mechanism be performed such that the cloth M maintains a temperature range of equal to or more than 100° C. and equal to or less than 200° C.

A linear encoder 10 detects a position of the carriage 4 in the main scanning direction with a signal. The detected signal is sent to the control device CONT as position information. The control device CONT recognizes a scanning position of the ink jet head 2 based on the position information from the linear encoder 10, and controls recording operation (ejecting operation) and the like by the ink jet head 2. In addition, the control device CONT is configured to change and control a movement speed of the carriage 4.

2. Pigment Printing Ink Jet Ink Composition

The pigment printing ink jet ink composition according to this embodiment includes a pigment, a resin particle, an organic solvent, and water. The organic solvent includes an amide compound represented by the following general formula (1).

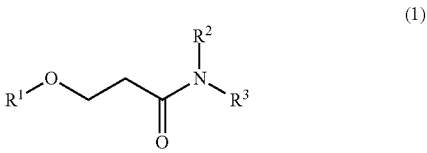

(1)

In the general formula (1), $R^1$ represents a straight chain or branched alkyl group having 1 to 6 carbon atoms, and $R^2$ and $R^3$ each independently represent hydrogen atoms or a straight chain or branched alkyl group having 1 to 4 carbon atoms.

Hereinafter, the pigment printing ink jet ink composition according to this embodiment will be described.

2. 1. Pigment

The pigment printing ink jet ink composition according to this embodiment includes a pigment. As the pigment is attached onto the cloth, printing is performed on the cloth, and thereby it is possible to obtain a printed matter (printed product).

As the pigment, either of an organic pigment and an inorganic pigment can be used, and a pigment having any color can be also used. In a case of using either pigment, it is possible to obtain a printed matter having excellent color developing properties.

Although not limited to the following, examples of a white pigment include a white inorganic pigment such as titanium oxide, zinc oxide, zinc sulfide, antimony oxide, and zirconium oxide, and the like. In addition to the white inorganic pigment, it is also possible to use a white organic pigment such as white hollow resin particle and polymer particle.

Although not limited to the following, examples of a color index (C.I.) of the white pigment include C.I. pigment white 1 (basic lead carbonate), 4 (zinc oxide), 5 (mixture of zinc sulfide and barium sulfate), 6 (titanium oxide), 6:1 (titanium oxide including other metal oxide), 7 (zinc sulfide), 18 (calcium carbonate), 19 (clay), 20 (mica titanium), 21 (barium sulfate), 22 (natural barium sulfate), 23 (gloss white), 24 (alumina white), 25 (plaster), 26 (magnesium oxide/silicon oxide), 27 (silica), 28 (anhydrous calcium silicate), and the like. Among these, as the white pigment, titanium oxide is preferable since titanium oxide is excellent in color developing properties, concealability, and visibility (brightness) and obtains a favorable dispersion particle diameter.

Among the titanium oxide, a general rutile type titanium oxide is preferable as the white pigment. The rutile type titanium oxide may be produced by itself or may be commercially available. Examples of an industrial production method in a case where the rutile type titanium oxide (powder form) is produced by itself include a sulfuric acid method and a chloride method in the related art. Examples of a commercially available product of the rutile type titanium oxide include rutile types of Tipaque (registered trademark) CR-60-2, CR-67, R-980, R-780, R-850, R-980, R-630, R-670, and PF-736 (hereinabove, trade name, manufactured by Ishihara Industries).

Examples of a chromatic color pigment include pigments excluding the white pigment. Although the chromatic color pigment is not limited to the following, as the pigment other than the white pigment, organic pigments such as azo-based pigment, phthalocyanine-based pigment, dye-based pigment, condensed polycyclic pigment, nitro-based pigment, and nitroso-based pigment (Brilliant Carmine 6B, Lake Red C, Watching Red, Disazo Yellow, Hansa Yellow, Phthalocyanine Blue, Phthalocyanine Green, Alkali Blue, Aniline Black, and the like), metals such as cobalt, iron, chrome, copper, zinc, lead, titanium, vanadium, manganese, and nickel, metal oxide and sulfide, carbon blacks such as furnace carbon black, lamp black, acetylene black, and channel black (C.I. pigment black 7), and inorganic pigments such as yellow soil, ultramarine blue, and dark blue can be used.

More specifically, examples of the carbon black used as a black pigment include No. 2300, No. 900, MCF88, No. 33, No. 40, No. 45, No. 52, MA7, MA8, MA100, No. 2200B, and the like (hereinabove, trade name, manufactured by Mitsubishi Chemical Corporation), Raven 5750, Raven 5250, Raven 5000, Raven 3500, Raven 1255, Raven 700, and the like (hereinabove, trade name, manufactured by Columbia Carbon Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (hereinabove, trade name, manufactured by Cabot Corporation), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (hereinabove, trade name, manufactured by Degussa Corporation), and the like.

Examples of the yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and the like.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, and C.I. Pigment Violet 19, 23, 32, 33, 36 38, 43, 50, and the like.

Examples of the cyan pigment include C.I. Pigment Blue 1, 2, 3, 15, 15:1, 15:2, 15:3, 15:34, 15:4, 16, 18, 22, 25, 60, 65, 66, and C.I. Vat Blue 4, 60, and the like.

Examples of the pigment other than black, yellow, magenta, and cyan include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, 63, and the like.

One of the pigments described above may be used alone, and two or more thereof may be used in combination.

A content of the pigment included in the pigment printing ink jet ink composition according to this embodiment varies depending on the kind of the pigment used, but from a viewpoint of ensuring favorable color developing properties, the content thereof is preferably equal to or more than 1% by mass, more preferably equal to or more than 3% by mass, and further more preferably equal to or more than 4% by mass, with respect to a total mass of the ink. In addition, the content of the pigment is preferably equal to or less than 30% by mass, more preferably equal to or less than 15% by mass, and further more preferably equal to or less than 12% by mass.

When preparing a pigment printing ink jet ink composition, a pigment dispersing liquid in which a pigment is dispersed may be prepared beforehand, and the obtained pigment dispersing liquid may be added and mixed to other material dispersing liquid. Examples of such a method of obtaining a pigment dispersing liquid include a method of dispersing its own dispersion pigment in a dispersing agent without using a dispersing agent, a method of dispersing a pigment in a dispersing agent using a resin dispersing agent, a method of dispersing a surface-treated pigment in a dispersing agent, and the like.

Resin Dispersing Agent

The resin dispersing agent is not particularly limited, and examples thereof include polyvinyl alcohols, polyvinyl pyrollidones, polyacrylic acids, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-anhydrous maleic acid copolymer, a vinyl naphthalene-acrylic acid copolymer, a vinyl naphthalene-maleic acid copolymer, a vinyl acetate-maleic acid ester copolymer, a vinyl acetate-crotonic acid polymer, a vinyl acetate-acrylic acid copolymer, and the like and salts thereof. Among these, a copolymer of a monomer having a hydrophobic functional group and a monomer having a hydrophilic functional group and a polymer made of a monomer having a hydrophobic functional group along with a hydrophilic functional group are particularly preferable. In addition, the copolymer can be used in any form of a random copolymer, a block copolymer, an alternating copolymer, and a graft copolymer.

As the resin dispersing agent, a commercially available product can be used. Specific examples thereof include Joncryl 67 (weight average molecular weight: 12,500, acid number: 213), Joncryl 678 (weight average molecular weight: 8,500, acid number: 215), Joncryl 586 (weight average molecular weight: 4,600, acid number: 108), Joncryl 611 (weight average molecular weight: 8,100, acid number: 53), Joncryl 680 (weight average molecular weight: 4,900, acid number: 215), Joncryl 682 (weight average molecular weight: 1,700, acid number: 238), Joncryl 683 (weight average molecular weight: 8,000, acid number: 160), Joncryl 690 (weight average molecular weight: 16,500, acid number: 240) (hereinabove, trade name, manufactured by BASF Japan Corporation), and the like.

2. 2. Resin Particle

The pigment printing ink jet ink composition according to this embodiment includes a resin particle. The resin particle has a function of improving fixability of an image formed by the ink composition by forming a resin film due to heating after recording, and also can improve washing solidity and friction fastness of the image. As the resin particle, any one in an emulsion state or a solution state can be used. However, from a viewpoint of suppressing rise in a viscosity of the ink, a resin particle in the emulsion state is preferably used.

As the resin of the resin particle, an acrylate-based resin, a styrene acrylate-based resin, a fluorene-based resin, a urethane-based resin, a polyolefin-based resin, a rosin-modified resin, a terpene-based resin, a polyester-based resin, a polyamide-based resin, an epoxy-based resin, a vinyl chloride resin, a vinyl chloride-vinyl acetate copolymer, a vinyl ethylene acetate-based resin, and the like can be used. One of these resins may be used alone or two or more thereof may be used in combination.

As the resin of the resin particle, among these, at least one selected from the urethane resin and the acrylate-based resin is preferably used since the design flexibility is high and thus desired physical properties are easily obtained, and from a viewpoint of securing the texture of the cloth and making the friction fastness favorable, the urethane resin is more preferably used. In addition, the urethane resin may be any urethane resin such as a polyester-based urethane resin including an ether bond, a polyester-based urethane resin including an ester bond, and a polycarbonate-based urethane resin including a carbonate bond. In a case of cross-linking the urethane resin having a cross-linking group, a degree of elongation at a rupture point, 100% modulus, or the like of the cross-linking body can be adjusted by changing density of a cross-linking point and the kind of such a main chain. Among these, the urethane resin including a cross-linking group having a polycarbonate skeleton or a polyester skeleton has a favorable balance between the degree of elongation at a rupture point and the 100% modulus, and is more preferable from a viewpoint of easily improving the friction fastness of an image and the texture of a printed matter. In addition, the polycarbonate-based urethane resin having a polycarbonate skeleton is preferable since the polycarbonate-based urethane resin having a polycarbonate skeleton tends to be able to make the friction fastness favorable.

As the urethane resin, a polycarbonate-based urethane resin, and a urethane resin including a cross-linking group are preferably included. Examples of the cross-linking group include an isocyanate group or a silanol group, and a blocked isocyanate group in which the isocyanate group is chemically protected, namely, capped or blocked is preferably used. The blocked isocyanate group is activated by being de-protected due to application of heat, and forms a bond, for example, a urethane bond, a urea bond, an allophanate bond, and the like.

In addition, the cross-linking group of the urethane resin including a cross-linking group is preferably provided by three or more per one molecule, and in such a case, due to reaction of the cross-linking group, a cross-linking structure is formed. The urethane resin in the present specification indicates a resin which is formed when an isocyanate group reacts with other reactive groups, for example, a hydroxyl group, an amino group, a urethane bond group, a carboxyl group, and the like, and has a urethane bond, a urea bond, an allophanate bond, and the like. Therefore, in the specification, for example, the urea resin is included in the urethane resin. The urethane resin is preferably a compound having a urethane bond obtained by reacting a compound including an isocyanate group with a compound including a hydroxyl group.

The blocked isocyanate includes a latent isocyanate group obtained by blocking the isocyanate group with a blocking agent, and can be obtained by reacting a polyisocyanate compound with a blocking agent, for example.

Examples of the polyisocyanate compound include a polyisocyanate monomer, a polyisocyanate derivative, and the like. Examples of the polyisocyanate monomer include a polyisocyanate such as aromatic polyisocyanate, aromatic aliphatic polyisocyanate, aliphatic polyisocyanate, and alicyclic polyisocyanate, and the like. One of the polyisocyanate monomers can be used alone or two or more thereof can be used in combination.

Examples of the polyisocyanate derivative include an allophanate-modified body such as allophanate-modified body generated by reacting the polyisocyanate monomer with a low-molecular polyol to be described later, for example, a polymer and a dimer of the polyisocyanate monomer, an isocyanurate-modified body, and a trimer, a pentamer, and a septamer of an iminooxadiazinedione-modified body, a polymol-modified body such as polyol-modified body (alcohol adduct) generated by reacting the polyisocyanate monomer with a low-molecular polyol to be described later, a biuret-modified body such as a biuret-modified body generated by reacting the polyisocyanate monomer with water or amines, a urea-modified body such as urea-modified body generated by reacting the polyisocyanate monomer with a diamine, an oxadiazinetriol-modified body such as oxadiazinetriol generated by reacting the polyisocyanate monomer and carbonic acid gas, a carbodiimide-modified body such as carbodiimide-modified body generated by decarboxylation condensation reaction of the polyisocyanate monomer, a uretodione-modified body, a uretonimine-modified body, and the like.

In a case where two or more of the polyisocyanate compounds are used in combination, for example, at the time of producing a blocked isocyanate, two or more polyisocyanate compounds may be simultaneously reacted, and a blocked isocyanate obtained by separately using each of the polyisocyanate compounds may be mixed with each other.

The blocking agent blocks and inactivates an isocyanate group, and on the other hand, regenerates or activates the isocyanate group after deblocking. In addition, the blocking agent also has a catalytic action of activating the isocyanate group in a blocked state and in a deblocked state.

Examples of the blocking agent include an imidazole-based compound, an imidazoline-based compound, a pyrimidine-based compound, a guanidine-based compound, an alcohol-based compound, a phenol-based compound, an active methylene-based compound, an amine-based compound, an imine-based compound, an oxime-based compound, a carbamic acid-based compound, a urea-based compound, an acid amide-based (lactam-based) compound, an acid imide-based compound, a triazole-based compound, a pyrazole-based compound, a mercaptan-based compound, bisulfate, and the like.

The blocking agent will be exemplified in detail below. For the exemplified compounds, dissociation temperatures are also described as a temperature of regenerating an isocyanate group.

Examples of the imidazole-based compound include imidazole (dissociation temperature 100° C.), benzimidazole (dissociation temperature 120° C.), 2-methylimidazole (dissociation temperature 70C), 4-methylimidazole (dissociation temperature 100° C.), 2-ethylimidazole (dissociation temperature 70C), 2-isopropylimidazole, 2,4-dimethylimidazole, 2-ethyl-4-methylimidazole, and the like.

Examples of the imidazoline-based compound include 2-methylimidazoline (dissociation temperature 110° C.), 2-phenylimidazole, and the like.

Examples of the pyrimidine-based compound include 2-methyl-1,4,5,6-tetrahydropyrimidine, and the like.

Examples of the guanidine-based compound include 3,3-dialkylguanidine such as 3,3-dimethylguanidine, for example, 1,1,3,3-tetraalkylguanidine such as 1,1,3,3-tetramethylguanidine (dissociation temperature 120° C.), 1,5,7-triazabicyclo[4.4.0]deca-5-en, and the like.

Examples of the alcohol-based compound include methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxypropanol, 2-ethoxyethanol, n-propoxyethanol, 2-butoxypropanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetoamide, N-hydroxysuccinimide, N-morpholine ethanol, 2,2-dimethyl-1,3-dioxsolane-4-methanol, 3-oxazolidine ethanol, 2-hydroxymethyl pyridine (dissociation temperature 140° C.), furfuryl alcohol, 12-hydroxy stearic acid, triphenyl silanol, methacrylic acid 2-hydroxy ethyl, and the like.

Examples of the phenol-based compound include phenol, cresol, ethyl phenol, n-propyl phenol, isopropyl phenol, n-butyl phenol, s-butyl phenol, t-butyl phenol, n-hexyl phenol, 2-ethylhexyl phenol, n-octyl phenol, n-nonyl phenol, di-n-propyl phenol, diisopropyl phenol, isopropyl cresol, di-n-butyl phenol, di-s-butyl phenol, di-t-butylphenol, di-n-octyl phenol, di-2-ethylhexyl phenol, di-n-nonyl phenol, nitrophenol, bromophenol, chlorophenol, fluorophenol, dimethyl phenol, styrenated phenol, methyl salicylate, 4-hydroxybenzonate methyl, 4-hydroxybenzonate benzyl, hydroxybenzonate 2-ethylhexyl, 4-[(dimethylamino)methyl]phenol, 4-[(dimethylamino)methyl]-nonylphenol, bis(4-hydroxy phenol)acetate, 2-hydroxypyridine (dissociation temperature 80° C.), 2- or 8-hydroxyquinoline, 2-chloro-3-pyridinol, pyridine-2-thiol (dissociation temperature 70° C.), and the like.

Examples of the active methylene-based compound include Meldrum's acid, for example, dialkyl malonate such as dimethyl malonate, diethyl malonate, di-n-butyl malonate, di-t-butyl malonate, di-2-ethylhexyl malonate, methyl-n-butyl malonate, ethyl-n-butyl malonate, methyl-s-butyl malonate, ethyl-s-butyl malonate, methyl-t-butyl malonate, ethyl-t-butyl malonate, diethyl methylmalonate, dibenzyl malonate, diphenyl malonate, benzylmethyl malonate, ethylphenyl malonate, t-butylphenyl malonate, and isopropylidene malonate, for example, alkyl acetoacetate such as methyl acetoacetate, ethyl acetoacetate, n-propyl acetoacetate, isopropyl acetoacetate, n-butyl acetoacetate, t-butyl acetoacetate, benzyl acetoacetate, and phenyl acetoacetate, for example, 2-acetoacetoxyethyl methacrylate, acetyl acetone, ethyl cyanoacetate, and the like.

Examples of the amine-based compound include dibutyl amine, diphenyl amine, aniline, N-methyl aniline, carbazole, bis(2,2,6,6-tetramethyl piperidinyl)amine, di-n-propyl amine, diisopropyl amine (dissociation temperature 130° C.), isopropylethyl amine, 2,2,4-, or, 2,2,5-trimethylhexamethylne amine, N-isopropyl cyclohexyl amine (dissociation temperature 140° C.), dicyclohexyl amine (dissociation temperature 130° C.), bis(3,5,5-trimethylcyclohexyl)amine, pyridine, 2,6-dimethyl piperidine (dissociation temperature 130° C.), t-butylmethyl amine, t-butylethyl amine (dissociation temperature 120° C.), t-butylpropyl amine, t-butylbutyl amine, t-butylbenzyl amine (dissociation temperature 120° C.), t-butylphenyl amine, 2,2,6-trimethyl piperidine, 2,2,6,6-tetramethyl piperidine (dissociation temperature 80° C.), (dimethyl amine)-2,2,6,6-tetramethyl piperidine, 2,2,6,6-tetraemthyl-4-piperidine, 6-methyl-2-piperidine, 6-aminocaproic acid, and the like.

Examples of the imine compound include ethylene imine, polyethylene imine, 1,4,5,6-tetrahydropyrimidine, guanidine, and the like.

Examples of the oxime compound include formaldoxime, acetoaldoxime, acetoxime, methylethyl ketoxime (dissociation temperature 130° C.), cyclohexanone oxime, diacetylmonoxime, penzofenoxime, 2,2,6,6-tetramethyl cyclohexanone oxime, diisopropyl ketone oxime, methyl t-butylketone oxime, diisobutyl ketone oxime, methyl isobutyl ketone oxime, methyl isopropyl ketone oxime, methyl 2,4-dimethyl pentyl ketone oxime, methyl 3-ethyl heptyl ketone oxime, methyl isoamyl ketone oxime, n-amyl ketone oxime, 2,2,4,4-tetramethyl-1,3-cyclobutanedione monoxime, 4,4'-dimethoxy benzophenone oxime, 2-heptanone oxime, and the like.

Examples of the carbamic acid-based compound include N-phenyl carbamic acid phenyl and the like.

Examples of the urea-based compound include urea, thiourea, ethylene urea, and the like.

Examples of the acid amide-based (lactam-based) compound include acetanilide, N-methylacetamide, acetic acid amide, ε-caprolactam, δ-valerolactam, γ-butyrolactam, pyrolidone, 2,5-piperazinedione, laurolactam, and the like.

Examples of the acid amide-based compound include succinimide, maleate imide, phthalimide, and the like.

Examples of the triazole-based compound include 1,2,4-triazole, benzotriazole, and the like.

Examples of the pyrazole-based compound include pyrazole, 3,5-dimethyl pyrazole (dissociation temperature 120° C.), 3,5-diisopropyl pyrazole, 3,5-diphenyl pyrazole, 3,5-di-t-butyl pyrazole, 3-methyl pyrazole, 4-benzyl-3,5-dimethyl pyrazole, 4-nitro-3,5-dimethyl pyrazole, 4-buromo-3,5-dimethyl pyrazole, 3-methyl-5-phenyl pyrazole, and the like.

Examples of the mercaptan-based compound include butyl mercaptan, dodecyl mercaptan, hexyl mercaptan, and the like.

Examples of the bisulfite include sodium hydrogensulfite, and the like.

In addition, the blocking agent is not particularly limited, and examples thereof include benzoxazolone, anhydrous isatoic acid, tetrabutyl phosphonium/acetate, and the like.

Such a blocking agent can be used alone, or two or more thereof can be used in combination. A dissociation temperature of the blocking agent can be appropriately selected. For example, the dissociation temperature is equal to or more than 60° C. and equal to or less than 230° C., preferably equal to or more than 80° C. and equal to or less than 200° C., more preferably equal to or more than 100° C. and equal to or less than 180° C., and further more preferably equal to or more than 110° C. and equal to or less than 160° C. If the dissociation temperature is within the temperature range, it is possible to sufficiently lengthen the pot life of the pigment printing ink jet ink composition and to prevent a temperature during the heating step from being too high.

In addition, a main chain of the urethane-based resin including a cross-linking group may be any of a polyether type including an ether bond, a polyester type including an ester bond, a polycarbonate type including a carbonate bond, and the like. The degree of elongation at a rupture point, 100% modulus, or the like in a case where the urethane resin including a cross-linking group (cross-linking body) can be adjusted by changing density of a cross-linking point and the kind of such a main chain. Among these, the urethane resin including a cross-linking group having a polycarbonate skeleton or a polyester skeleton has a favorable balance between the degree of elongation at a rupture point and the 100% modulus, and is more preferable from a viewpoint of easily improving the friction fastness of an image and the texture of a printed matter. In addition, the polycarbonate-based urethane resin having a polycarbonate skeleton is preferable since the polycarbonate-based urethane resin having a polycarbonate skeleton tends to be able to make the friction fastness favorable. In addition, the pigment becomes easily fixed on the cloth surface, and a printed matter excellent in color developing properties and friction fastness is obtained.

On the other hand, there is a case where, in the polycarbonate-based resin or the urethane resin including a cross-linking group, the resin particle forms a film in a nozzle and thus clogging occurs. Therefore, by causing the polycarbonate-based resin or the urethane resin including a cross-linking body to include the specific amide compound as an organic solvent, it is possible to more favorably suppress clogging due to film formation.

In a cross-linking body after cross-linking is formed, the degree of elongation at a rupture point of the urethane-based resin including a cross-linking group is equal to or more than 150%, preferably equal to or more than 170%, more preferably equal to or more than 200%, and further more preferably equal to or more than 300%. By selecting the density of the cross-linking point, the type of the main chain, or the like such that the degree of elongation at a rupture point is within the range, it is possible to improve the texture of the printed matter.

Here, as the degree of elongation at a rupture point, it is possible to employ a value obtained by curing a urethane resin emulsion including a cross-linking group, preparing a film having a thickness of approximately 60 μm, and performing measurement in the condition of a tensile test gauge length of 20 mm and a tensile speed of 100 mm/minute. In addition, as the 100% modulus, it is possible to employ a value obtained by measuring a tensile stress when the film in the tensile test is extended by 100% with respect to the original length. The film to be measured may be formed by using the urethane resin emulsion including a cross-linking group or may be formed by molding using the same kind of resin. However, it is preferable that the film to be measured be formed by using an emulsion resin.

The urethane resin including a cross-linking group may be mixed in an emulsion form. Such a resin emulsion is a so-called self-reactive urethane resin emulsion, and it is possible to use a commercially available urethane resin emulsion as the urethane resin emulsion including an isocyanate group blocked with a blocking agent including a hydrophilic group.

Examples of the commercially available urethane resin including a cross-linking group include Takelac WS-6021 (trade name, manufactured by Mitsui Chemicals & SKC Polyurethanes Inc., urethane resin emulsion, polyether-based polyurethane, having a polyether-derived skeleton), WS-5100 (trade name, manufactured by Mitsui Chemicals & SKC Polyurethanes Inc., urethane resin emulsion, polycarbonate-based polyurethane, having a polycarbonate-derived skeleton), Elastron E-37, H-3 (hereinabove, polyester-based polyurethane in which the main chain has a polyester-derived skeleton), Elastron H-38, BAP, C-52, F-29, W-11P (hereinabove, polyether-based polyurethane in which the main chain has a polyether-derived skeleton) (trade name, manufactured by DKS Co., Ltd., urethane resin emulsion), Superflex 870, 800, 150, 420, 460, 470, 610, 700 (trade name, manufactured by DKS Co., Ltd., urethane resin emulsion), Pamarin UA-150 (trade name, manufactured by Sanyo Chemical Industries, urethane resin emulsion), Sancure-2710 (trade name, manufactured by Lubrizol Japan Ltd., urethane resin emulsion), NeoRez R-9660, R-9637, R-940 (trade name, manufactured by Kusumoto Chemicals Ltd., urethane resin emulsion), Adecabon Titer HUX-380, 290K (trade name, manufactured by ADEKA Corporation, urethane resin emulsion), and the like.

In this embodiment, a content of the resin particle is preferably equal to or more than 1% by mass, more preferably equal to or more than 2.5% by mass, and further more preferably equal to or more than 3% by mass with respect to a total mass of the ink, in terms of solid portion. In addition, an upper limit value of the content of the resin particle is preferably equal to or less than 20% by mass, more preferably equal to or less than 15% by mass, and further more preferably equal to or less than 12% by mass. As the content of the resin particle is within the range, a printed matter excellent in color developing properties, clogging resistance, and friction fastness is obtained.

In a pigment printing ink jet recording method in this embodiment to be described later, the resin particle may be included in a processing liquid in a case where the processing liquid is used. In this case, the resin particle included in the processing liquid and the resin particle included in the pigment printing ink jet ink composition may be the same or different.

In addition, a temperature in a heating step in the pigment printing ink jet recording method in this embodiment to be described later is set such that at least a portion of the cross-linking group is activated, considering a de-protection temperature of an isocyanate group of the urethane-based resin including a cross-linking group, that is, a dissociation temperature.

2. 3. Organic Solvent

The pigment printing ink jet ink composition according to this embodiment includes an organic solvent. As the pigment printing ink jet ink composition according to this embodiment includes an organic solvent, it is possible to obtain an image excellent in clogging resistance at the time of recording, having favorable dryness of the ink composition ejected on a recording medium, and excellent in color developing properties and friction fastness.

In this embodiment, the organic solvent used in the pigment printing ink jet ink composition is preferably a water-soluble organic solvent. By using a water-soluble organic solvent, it is possible to obtain an image having more favorable dryness of the ink composition and excellent in color developing properties and friction fastness.

In addition, the pigment printing ink jet ink composition according to this embodiment includes an alkyl amide compound (hereinafter, referred to as "specific amide compound") represented by the following general formula (1) as the organic solvent.

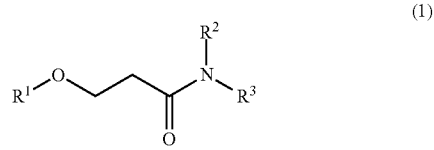

(1)

In the general formula (1), $R^1$ represents a straight chain or branched alkyl group having 1 to 6 carbon atoms, and $R^2$ and $R^3$ each independently represent hydrogen atoms or a straight chain or branched alkyl group having 1 to 4 carbon atoms.

In the general formula (1), $R^1$ represents a straight chain or branched alkyl group having 1 to 6 carbon atoms, and Examples of the straight chain or branched alkyl group having 1 to 6 carbon atoms include a methyl group, an ethyl group, a propyl group, a isopropyl group, an n-butyl group, a sec-butyl group, a isobutyl group, a tert-butyl group, a 2,2-dimethylpropyl group, a 3-methylbutyl group, a 1-methylbutyl group, a 1-ethylpropyl group, a 1,1-dimethylpropyl group, and a hexyl group. Among these, the methyl group is preferable.

In the general formula (1), $R^2$ and $R^3$ each independently represent hydrogen atoms or a straight chain or branched alkyl group having 1 to 4 carbon atoms. Examples of the straight chain or branched alkyl group having 1 to 4 carbon atoms include a methyl group, an ethyl group, a propyl group, an isopropyl group, an n-butyl group, a sec-butyl group, an isobutyl group, and a tert-butyl group. Among these, the methyl group is preferable.

Examples of the alkylamide compound represented by the general formula (1) include 3-methoxy-N,N-dimethyl propionamide, 3-methoxy-N,N-diethyl propionamide, 3-methoxy-N,N-methylethyl propionamide, 3-ethoxy-N,N-dimethyl propionamide, 3-ethoxy-N,N-diethyl propionamide, 3-ethoxy-N,N-methylethyl propionamide, 3-n-butoxy-N,N-dimethyl propionamide, 3-n-butoxy-N,N-diethyl propionamide, 3-n-butoxy-N,N-methylethyl propionamide, 3-n-propoxy-N,N-dimethyl propionamide, 3-n-propoxy-N,N-diethyl propionamide, 3-n-propoxy-N,N-methylethyl propionamide, 3-isopropoxy-N,N-dimethyl propionamide, 3-isopropoxy-N,N-diethyl propionamide, 3-isopropoxy-N,N-methylethyl propionamide, 3-tert-butoxy-N,N-dimethyl propionamide, 3-tert-butoxy-N,N-diethyl propionamide, 3-tert-butoxy-N,N-methylethyl propionamide, and the like.

In a polyester cloth, as the pigment printing ink jet ink composition according to this embodiment includes the specific amide compound, the ink is easily maintained on the surface and color development can be favorable. It is estimated that it is because the ink hardly flows down between fabrics of the cloth, and thus the ink is easily maintained on the surface. Since the polyester cloth has a small amount of hydrophilic groups in the fiber, in an aqueous ink in the related art, the ink flows down between fabrics and permeates into the cloth, and thus it is difficult to obtain color developing properties. However, in the pigment printing ink jet ink composition according to this embodiment, it is estimated that as the specific amide compound is included, the affinity of the fabrics of the polyester cloth with the ink is increased and the ink hardly permeates into the cloth.

On the other hand, also in the cotton cloth, as the pigment printing ink jet ink composition according to this embodiment includes the specific amide compound, color development can be favorable. It is estimated that this is because the ink is suppressed to excessively permeate into the fibers of the cloth and spread. Since the cotton cloth has a large amount of hydrophilic groups in the fiber, and the fabric is dense, in the aqueous ink in the related art, the ink permeates and spreads into the fiber, and it is difficult to obtain the color developing properties. However, in the pigment printing ink jet ink composition according to this embodiment, as the specific amide compound is included, the affinity of the fibers of the cotton cloth with the ink is appropriate, and thus it is estimated that the ink is suppressed to excessively permeate into the fibers.

In addition, in pigment printing, when a resin particle added for the purpose of improving fastness is included, the resin particle forms a film in the nozzle, and thus there is a case where clogging occurs. Here, in order to dissolve the resin particle, the clogging can be suppressed by adding a resin dissolving solvent, but this causes the resin dissolving solvent to remain in a recording medium and thus dryness tends to deteriorate. On the contrary, in the pigment printing ink jet ink composition according to this embodiment, by using the specific amide compound, compatibility between the organic solvent and the resin particle is increased, and thus it is possible to improve dispersibility of the resin particle in the ink. For this reason, as the pigment printing ink jet ink composition according to this embodiment includes the specific amide compound, it is possible to make both of resin solubility and dryness favorable and to make the pigment printing ink jet ink composition excellent in clogging resistance at the time of recording. In addition, when a urethane resin is used as the resin particle, it is possible to make friction fastness more favorable.

In this embodiment, a content of the specific amide compound is preferably equal to or more than 30% by mass, more preferably equal to or more than 70% by mass, further more preferably equal to or more than 75% by mass, and further more preferably equal to or more than 80% by mass, with respect to a total mass of the organic solvent included in the pigment printing ink jet ink composition. When the content of the specific amide compound is within the range, it is possible to make color development more favorable with respect to any of the cotton cloth and the polyester cloth and to make the pigment printing ink jet ink composition excellent in clogging resistance or dryness at the time of recording. In addition, the content of the specific amide compound is preferably equal to or less than 90% by mass, and more preferably equal to or less than 86% by mass. By setting the content of the specific amide compound to be within such a range, the pigment printing ink jet ink composition becomes excellent in clogging resistance at the time of recording.

In addition, in this embodiment, the content of the specific amide compound is preferably equal to or more than 3% by mass, more preferably equal to or more than 10% by mass, further more preferably equal to or more than 16% by mass, and further more preferably equal to or more than 18% by mass, with respect to a total mass of the pigment printing ink jet ink composition. In addition, the content of the specific amide compound is preferably equal to or less than 30% by mass, more preferably equal to or less than 25% by mass, and further more preferably equal to or less than 22% by mass, with respect to the total mass of the pigment printing ink jet ink composition. When the content of the specific amide compound is within the range, it is possible to make color development more favorable with respect to any of the cotton cloth and the polyester cloth, and to make the pigment printing ink jet ink composition excellent in clogging resistance or dryness at the time of recording.

In addition, in this embodiment, the content of the specific amide compound is preferably equal to or more than 1.5 and equal to or less than 20, at a mass ratio, with respect to the resin particle, and a lower limit value thereof is more preferably equal to or more than 2.0, and further more preferably equal to or more than 3.2. In addition, the upper limit value is preferably equal to or less than 10, and further more preferably equal to or less than 6.0. By setting the content of the specific amide compound to be within the range, it is possible to favorably suppress precipitation of the resin particle and to make the pigment printing ink jet ink composition excellent in clogging resistance while favorably maintaining friction fastness. In addition, from a viewpoint of making friction resistance favorable, the content of the specific amide compound is preferably equal to or more than 0.5 and equal to or less than 1.0, and more preferably equal to or more than 0.7 and equal to or less than 0.9, at a mass ratio, with respect to the resin particle.

Examples of an organic solvent other than the specific amide compound include a polyol compound, glycol ether, a betaine compound, and the like.

Examples of the polyol compound include a polyol compound that may have 2 to 6 carbon atoms in a molecule and may have one ether bond in a molecule, and the polyol compound is preferably a diol compound. Specific examples thereof include glycols such as 1,2-pentanediol, triethylene glycol monomethyl ether, triethylene glycol monobutyl ether, diethylene glycol monobutyl ether, dipropylene glycol monopropyl ether, glycerine, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

Examples of glycol ether preferably include monoalkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. Examples thereof more preferably include triethylene glycol monomethyl ether, triethylene glycol monobutyl ether, dipropylene glycol monopropyl ether, and the like.

The betaine compound is a compound (intramolecular salt) having a positive charge and a negative charge at non-adjacent positions in the same molecule and having no charge as a whole molecule, in which a dissociable hydrogen atom is not bonded to an atom having a positive charge. A preferable betaine compound is an N-alkyl substitute of an amino acid, and a more preferable betaine compound is an N-trialkyl substitute of an amino acid. Examples of the betaine compound include trimethyl glycine (referred to as "glycine betaine"), γ-butyrobetaine, homarine, trigonelline, carnitine, homoserine betaine, valine betaine, lysin betaine, ornithine betaine, alanine betaine, stachydrine, betaine glutamate, and the like, and preferably include trimethyl glycine and the like.

In addition, as the organic solvent, a pyrrolidone derivative may be used. Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like.

A plurality of kinds of the organic solvents may be used. In addition, the organic solvent is preferably added so as to obtain desired ink viscosity and surface tension to be described later, a content thereof is preferably equal to or more than 5% by mass, more preferably equal to or more than 10% by mass, and further more preferably equal to or more than 15% by mass, with respect to a total mass of the ink. In addition, the content of the organic solvent is preferably equal to or less than 35% by mass, more preferably equal to or less than 30% by mass, and further more preferably equal to or less than 25% by mass, with respect to a total mass of the pigment printing ink jet ink composition.

2. 4. Water

The pigment printing ink jet ink composition according to this embodiment includes water as a solvent. Water is a main medium of the ink and is a component that evaporates and scatters by drying. Examples of water include water obtained by removing ionic impurities as much as possible, that is, pure water such as ion exchanged water, ultrafiltration water, reverse osmotic water, and distilled water and super pure water. In addition, if water obtained by sterilization by ultraviolet ray emission or addition of hydrogen peroxide is used, it is possible to prevent generation of mold or bacteria in a case where the ink is stored for a long period of time.

The content of water included in the pigment printing ink jet ink composition according to this embodiment is not particularly limited, but the content thereof can be equal to or more than 50% by mass, equal to or more than 60% by mass, and equal to or more than 70% by mass, with respect to a total mass of the ink. In addition, an upper limit of the content of water included in the ink can be equal to or less than 95% by mass, equal to or less than 90% by mass, and equal to or less than 80% by mass.

2. 5. Surfactant

The pigment printing ink jet ink composition according to this embodiment may include a surfactant. The surfactant has a function of lowering surface tension of the ink composition, improving wettability to the cloth, and the like. The surfactant easily adjusts the ink viscosity and the surface tension to be desired ink viscosity and surface tension required in the ink jet pigment printing method according to this embodiment.

Among the surfactants, an acetylene glycol-based surfactant, an acetylene alcohol-based surfactant, a silicone-based surfactant, and a fluorine-based surfactant can be preferably used. Among these, from a viewpoint of easily making the surface tension of the ink composition as a desired property, the silicone-based surfactant and the fluorine-based surfactant are preferably used.

The acetylene glycol-based surfactant is not particularly limited, and examples thereof include Safinol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (hereinabove, trade name, manufactured by Air Products and Chemicals. Inc.), Orfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (hereinabove, trade name, manufactured by Nissin Chemical Co., Ltd.), and Acetylenol E00, EOOP, E40, E100 (hereinabove, trade name, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, BYK-348 (hereinabove, trade name, manufactured by BYK Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinabove, trade name, manufactured by Shin-Etsu Chemical Co., Ltd.).

As the fluorine-based surfactant, a fluorine-modified polymer is preferably used, and specific examples thereof include BYK-340 (manufactured by BYK Japan).

A content of a surfactant is preferably equal to or more than 0.1% by mass, more preferably equal to or more than 0.3% by mass, and further more preferably equal to or more than 0.5% by mass, with respect to a total mass of the ink. In addition, the content of the surfactant is preferably equal to or less than 10% by mass, more preferably equal to or less than 7% by mass, further more preferably equal to or less than 5% by mass, particularly preferably equal to or less than 2% by mass, and further particularly preferably equal to or less than 1% by mass, with respect to the total mass of the ink.

2. 6. Inorganic Alkali Compound

The pigment printing ink jet ink composition according to this embodiment preferably includes an inorganic alkali compound (inorganic base compound). The inorganic alkali compound has properties of enhancing a pH of the pigment printing ink jet ink composition. In addition, the inorganic alkali compound enhances dispersion stability of the resin particle, and thus has a function of improving re-dispersibility of the resin particle.

Examples of the inorganic alkali compound include a hydroxide of alkali metal or a hydroxide of alkali earth metal, a carbonate of alkali metal or a carbonate of alkali earth metal, a phosphate of alkali metal or a phosphate of alkali earth metal, and the like.

Examples of the hydroxide of alkali metal include a lithium hydroxide, a sodium hydroxide, a potassium hydroxide, and the like. Examples of the hydroxide of the alkali earth metal include a calcium hydroxide, a magnesium hydroxide, and the like.

Examples of the carbonate of alkali metal include a lithium carbonate, a lithium hydrogen carbonate, a potassium carbonate, a potassium hydrogen carbonate, a sodium carbonate, a sodium hydrogen carbonate, and the like. Examples of the carbonate of alkali earth metal include a calcium carbonate and the like.

Examples of the phosphate of alkali metal include a lithium phosphate, a potassium phosphate, a potassium dihydrogen phosphate, a trisodium phosphate, a disodium hydrogen phosphate, and the like. Examples of the phosphate of alkali earth metal include a calcium phosphate, a calcium hydrogen phosphate, and the like.

As the pigment printing ink jet ink composition according to this embodiment, a plurality of kinds of inorganic alkali compounds exemplified above may be used. A total content of the inorganic alkali compounds is preferably equal to or more than 0.01% by mass and equal to or less than 0.8% by mass, more preferably equal to or more than 0.02% by mass and equal to or less than 0.6% by mass, and further more preferably equal to or more than 0.03% by mass and equal to or less than 0.4% by mass, with respect to a total mass of the pigment printing ink jet ink composition.

If a mixture amount of the inorganic alkali compound is within the range, it is possible to sufficiently enhance a pH of the pigment printing ink jet ink composition and to exhibit a function of improving re-dispersibility of the resin particle since dispersion stability of the resin particle is enhanced.

2. 7. Other Components

The pigment printing ink jet ink composition according to this embodiment may include a pH adjusting agent, a preservative/anti-mold agent, a rust preventive agent, a chelating agent, a viscosity adjusting agent, a solubilizing aid, an anti-oxidant, and the like, depending on the necessity.

pH Adjusting Agent

In addition to the inorganic alkali compounds, examples of the pH adjusting agent include amines having a standard boiling point of 200° C. or more at 25 C such as morpholines, piperazines, diethanolamine, triethanolamine, and triisopropanolamine, and the like. Among these, amines having a standard boiling point of 200° C. or more at 25 C is preferably included. As such a high boiling point amine is included, it is possible to suppress clogging of the head at a temperature of the heating step in the pigment printing ink jet recording method according to this embodiment to be described later.

Preservative/Anti-Mold Agent

Examples of the preservative/anti-mold agent include a sodium benzoate, a pentachlorophenol sodium, 2-piridinethiol-1-oxide sodium, sorbic acid sodium, sodium dehydroacetate, 1,2-dibenzoisothiazolin-3-on (Proxel CRL, Proxel BND, Proxel GXL, Proxel XL-2, Proxel TN of ICI Corporation), and the like.

Chelating Agent

The chelating agent has properties of capturing ions. Examples of such a chelating agent include an ethylenediamine tetraacetate (EDTA), a nitrilotriacetic acid salt of ethylenediamine, hexametaphosphate, pyrophosphate, metaphosphate, and the like.

2. 8. Method of Preparing Pigment Printing Ink Jet Ink Composition

The pigment printing ink jet ink composition according to this embodiment is obtained by mixing the above-described components with one another in an optional order, and removing impurities by performing filtration and the like depending on the necessity. As a method of mixing each component, a method of performing stirring and mixing by sequentially adding materials to a container with a stirring device such as mechanical stirrer and magnetic stirrer is appropriately used. As a filtration method, it is possible to perform centrifugal filtration, filter filtration, and the like, depending on the necessity.

2. 9. Physical Properties of Pigment Printing Ink Jet Ink Composition

The pigment printing ink jet ink composition according to this embodiment is imparted to the cloth by an ink jet method. For this reason, from a viewpoint of the balance between recording quality and reliability as an ink for ink jet recording, surface tension at 25° C. of the pigment printing ink jet ink composition is preferably equal to or more than 10 mN/m and equal to or less than 40 mN/m, and more preferably equal to or more than 25 mN/m and equal to or less than 40 mN/m. The surface tension can be measured by checking the surface tension when a platinum plate is wet with an ink in an environment of 25° C., using an automatic surface tension meter CBVP-Z (trade name, manufactured by Kyowa Interface Science Co., Ltd.), for example.

In addition, from the same viewpoint, a viscosity at 20° C. of the pigment printing ink jet ink composition is preferably equal to or more than 2 mPa·s and equal to or less than 15 mPa·s, more preferably equal to or more than 2 mPa·s and equal to or less than 5 mPa·s, and further more preferably equal to or more than 2 mPa·s and equal to or less than 3.6 mPa·s. The viscosity can be measured by measuring a viscosity in an environment of 20° C. using a viscoelastic tester MCR-300 (trade name, manufactured by Pysica Corporation), for example.

2. 10. Operation/Effect

As described above, as the pigment printing ink jet ink composition according to this embodiment includes the specific amide compound, the pigment printing ink jet ink composition becomes excellent in color developing properties with respect to various cloths such as polyester cloth and cotton cloth. In addition, as the ink includes the specific amide compound, the pigment printing ink jet ink composition becomes excellent in dryness and clogging resistance at the time of recording. In addition, in a case where a urethane resin is used as the resin particle, it is possible to obtain favorable friction fastness.

3. Processing Liquid Composition

In this embodiment, in order to further improve color developing properties and to obtain a printed matter excellent in friction fastness, a processing liquid composition is preferably used.

The processing liquid composition used in this embodiment aggregates components of the ink composition, and is preferably used in a pigment printing ink jet recording method performed by attaching the pigment printing ink jet ink composition according to this embodiment onto a cloth by an ink jet method. Hereinafter, the processing liquid composition used in this embodiment will be described.

3. 1. Aggregating Agent

Examples of the aggregating agent included in such a processing liquid composition include a cationic compound such as polyvalent metal salt, organic acid, cationic resin, cationic surfactant, and the like. One of these aggregating agents may be used alone, or two or more thereof may be used in combination. Among these aggregating agents, from a viewpoint of excellent reactivity with the pigment or resin particle included in the ink composition, at least one selected from the polyvalent metal salt and the organic acid is preferably used, and the polyvalent metal salt is more preferably used.

The polyvalent metal salt includes a divalent or higher polyvalent metal ion and a negative ion bonded to the polyvalent metal ion, and is a compound soluble in water. Specific examples of the polyvalent metal ion include a divalent metal ion such as $Ca^{2+}$, $Cu^{2+}$, $Ni^{2+}$, $Mg^{2+}$, $Zn^{2+}$, and $Ba^{2+}$; and a trivalent metal ion such as $Al^{3+}$, $Fe^{3+}$, and $Cr^{3+}$. Examples of the negative ion include $Cl^-$, $I^-$, $Br^-$, $So_4^{2-}$, $ClO^{3-}$, $NO^{3-}$, $HCOO^-$, $CH_3COO^-$, and the like. Among these polyvalent metal salts, from a viewpoint of stability of the processing liquid and reactivity as an aggregating agent, the calcium salt and the magnesium salt are preferable, and any of a calcium nitrate and a calcium chloride is preferable.

Examples of the organic acid appropriately include a sulfuric acid, a hydrochloric acid, a nitric acid, a phosphoric acid, a polyacrylic acid, an acetic acid, a glycolic acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrrolidone carboxylic acid, a pyrone carboxylic acid, a pyrrole carboxylic acid, a furan carboxylic acid, a pyridine carboxylic acid, a coumaric acid, a thiophene carboxylic acid, a nicotinic acid, a derivative of a compound thereof, or a salt thereof. The organic acid may be used alone, or two or more thereof may be used in combination.

Examples of the cationic resin include a cationic urethane resin, a cationic olefin resin, a cationic allylamine resin, and the like.

As the cationic urethane resin, a known one can be appropriately selected and used. As the cationic urethane resin, a commercially available product can be used, and examples thereof include Hydran CP-7010, CP-7020, CP-7030, CP-7040, CP-7050, CP-7060, CP-7610 (trade name, manufactured by DIC Corporation), Superflex 600, 610, 620, 630, 640, 650 (trade name, manufactured by DKS Co., Ltd.), urethane emulsion WBR-2120C, WBR-2122C (trade name, manufactured by Taisei Fine Chemical Co., Ltd.), and the like.

The cationic olefin resin includes olefin such as ethylene and propylene in the structural skeleton, and a known one can be appropriately selected and used. In addition, the cationic olefin resin may be in an emulsion state dispersed in a solvent including water, an organic solvent, and the like. As the cationic olefin resin, a commercially available product can be used, and examples thereof include ARROWBASE CB-1200, CD-1200 (trade name, manufactured by Unitika Ltd.), and the like.

As the cationic allylamine resin, a known one can be appropriately selected and used. Examples of the cationic allylamine include a polyallylamine hydrochloride, a polyallylamine amide sulfate, an allylamine hydrochloride/diallylamine hydrochloride copolymer, an allylamine acetate/diallylamine acetate copolymer, an allylamine acetate/diallylamine acetate copolymer, an allylamine hydrochloride/dimethylallylamine hydrochloride copolymer, an allylamine/dimethylallylamine copolymer, a polydiallylamine hydrochloride, a polymethyl diallylamine hydrochloride, a polymethyl diallylamine amidosulfate, a polymethyl diallylamine acetate, a polydiallyl dimethylammonium chloride, a diallylamine acetate/sulfur dioxide copolymer, a diallylmethylethyl ammonium ethylsulfide/sulfur dioxide copolymer, a methyldiallylamine chloride/sulfur dioxide copolymer, a diallyldimethyl ammonium chloride/sulfur dioxide copolymer, a diallyldimethyl ammonium chloride/acrylamide copolymer, and the like. As such a cationic allylamine resin, a commercially available product can be used, and examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, PAS-J-81 (trade name, manufactured by Nittobo Medical Co., Ltd.), Hymo Neo-600, Hymoloc Q-101, Q-311, Q-501, Hymax SC-505, SC-505 (trade name, manufactured by Hymo Corporation), and the like.

Examples of the cationic surfactant include primary, secondary, and tertiary amine salt type compounds, an alkylamine salt, a dialkylamine salt, an aliphatic amine salt, a benzalkonium salt, a quaternary ammonium salt, a quaternary alkyl ammonium salt, an alkylpyridinium salt, a sulfonium salt, a phosphonium salt, an onium salt, an imidazolinium salt, and the like. Specific examples of the cationic surfactant include a chloride such as laurylamine, a coconut amine, a rosin amine, and the like, an acetate and the like, a lauryl trimethyl ammonium chloride, a cetyl trimethyl ammonium chloride, a benzyl tributyl ammonium chloride, a benzalkonium chloride, a dimethyletyl lauryl ammonium ethyl sulfate, a dimethylethyl octyl ammonium ethyl sulfate, a trimethyl lauryl ammonium chloride, a cetyl pyridinium chloride, a cetyl pyridinium bromide, a dihydroxy ethyl laurylamine, a decyl dimethyl benzyl ammonium chloride, a dodecyl dimethyl benzyl ammonium chloride, a tetradecyl dimethyl ammonium chloride, a hexadecyl dimethyl ammonium chloride, an octadecyl dimethyl ammonium chloride, and the like.

A content of the aggregating agent may be equal to or more than 0.1% by mass and equal to or less than 25% by mass, equal to or more than 0.2% by mass and equal to or less than 20% by mass, and equal to or more than 0.3% by mass and equal to or less than 10% by mass, with respect to a total mass of the processing liquid. In addition, concentration of the aggregating agent may be equal to or more than 0.03 mol/kg in 1 kg of the processing liquid. In addition, the concentration of the aggregating agent may be equal to or more than 0.1 mol/kg and equal to or less than 1.5 mol/kg, and equal to or more than 0.2 mol/kg and equal to or less than 0.9 mol/kg, in 1 kg of the processing liquid.

3. 2. Water

The processing liquid used in this embodiment preferably has water as a main solvent. The water is a component that evaporates and scatters by drying after the processing liquid is attached onto a recording medium. Since the same water as the water exemplified in the above-described ink can be used as the water, the example is not repeated. A content of the water included in the processing liquid can be equal to or more than 50% by mass, preferably equal to or more than 60% by mass, more preferably equal to or more than 70% by mass, and further more preferably equal to or more than 80% by mass, with respect to the total mass of the processing liquid.

3. 3. Water-Soluble Organic Solvent

The processing liquid used in this embodiment may be added with a water-soluble organic solvent. By adding the water-soluble organic solvent, it is possible to improve wettability of the processing liquid with respect to a recording medium. As the water-soluble organic solvent, the same as the organic solvent exemplified in the above-described ink composition can be used. A content of the water-soluble organic solvent is not particularly limited, but can be equal to or more than 1% by mass and equal to or less than 40% by mass, with respect to a total mass of the processing liquid.

3. 4. Surfactant

The processing liquid used in this embodiment may be added with a surfactant. By adding the surfactant, it is possible to decrease the surface tension of the processing liquid and to improve wettability of the recording medium. Among the surfactants, an acetylene glycol-based surfactant, a silicone-based surfactant, and a fluorine-based surfactant can be preferably used, for example. As a specific example of the surfactant, the same as the surfactant exemplified in the above-described ink composition can be used. A content of the surfactant is not particularly limited, but can be equal to or more than 0.1% by mass and equal to or less than 1.5% by mass, with respect to the total mass of the processing liquid.

3. 5. Resin Particle

The processing liquid used in this embodiment can be mixed with a resin particle such as a resin emulsion for the purpose of improving the friction fastness and suppressing fluffing of the cloth. In addition, as the resin particle is included, color developing properties are improved. As such a resin particle, the same resin as the resin particle usable in the ink can be used, and a commercially available product can be used. In a case of the urethane resin, examples thereof include Superflex 500, 6E-2000, E-2500, E-4000, R-5000 (trade name, manufactured by DKS Co., Ltd.), Adecabon Titer HUX-822, 830 (trade name, manufactured by ADEKA Corporation), and the like. Examples of the vinyl acetate resin include Vinyblan 1245L, 2680, 2682, 2684 (trade name, manufactured by Nissan Chemical Industry Co., Ltd.), and the like. Examples of the acrylic resin include Bonkote AN-402, R-3310, R-3360 (trade name, manufactured by DIC Corporation), and the like. Examples of the styrene acrylic resin include Mowinyl 966A (trade name, manufactured by Nippon Synthetic Chemical Industry Co., Ltd.) and the like.

A lower limit of a content of the resin particle in the processing liquid is preferably equal to or more than 1% by mass, more preferably equal to or more than 3% by mass, and further more preferably equal to or more than 5% by mass, with respect to a total mass of the processing liquid composition. In addition, an upper limit of the content of the resin particle is preferably equal to or less than 12% by mass, more preferably equal to or less than 10% by mass, and further more preferably equal to or less than 8% by mass, with respect to the total mass of the processing liquid composition. As the content of the resin particle in the processing liquid is within the range, it is possible to further improve color developing properties and friction fastness and to suppress fluffing of the cloth.

In this embodiment, the resin particle is preferably a non-ionic or cationic resin particle. In a case where the resin particle is a non-ionic resin particle, a printed matter excellent in color developing properties is obtained, particularly in printing with respect to a cotton cloth. In addition, in a case where the resin particle is a cationic resin particle, a printed matter excellent in color developing properties is obtained, particularly in printing with respect to a polyester cloth.

3. 6. Other Components

The processing liquid used in this embodiment may be added with a pH adjusting agent, a preservative, an anti-mold agent, a rust preventive agent, a chelating agent, and the like. As the other components, the same as those exemplified in the above-described ink composition can be used.

3. 7. Method of Preparing Processing Liquid

The processing liquid used in this embodiment can be prepared by dispersing/mixing each of the components by an appropriate method. After sufficiently stirring each of the components, filtration is performed in order to remove a coarse particle and a foreign matter that cause closing and thereby a targeted processing liquid can be obtained.

3. 8. Physical Properties of Processing Liquid

In a case where the processing liquid used in this embodiment is ejected from an ink jet recording head, the surface tension at 20° C. is preferably equal to or more than 20 mN/m and equal to 40 mN/m, and more preferably equal to or more than 20 mN/m and equal to or less than 35 mN/m. The surface tension can be measured by checking the surface tension when a platinum plate is wet with an ink in an environment of 20° C., using an automatic surface tension meter CBVP-Z (trade name, manufactured by Kyowa Interface Science Co., Ltd.), for example.

In addition, from the same viewpoint, a viscosity at 20° C. of the processing liquid used in this embodiment is preferably equal to or more than 3 mPa·s and equal to or less than 10 mPa·s, and more preferably equal to or more than 3 mPa·s and equal to or less than 8 mPa·s. The viscosity can be measured by measuring a viscosity in an environment of 20° C. using a viscoelastic tester MCR-300 (trade name, manufactured by Pysica Corporation), for example.

4. Cloth

The pigment printing ink jet recording method according to this embodiment is performed on the cloth. The material constituting the cloth is not particularly limited, and examples thereof include a natural fiber such as cotton, hemp, wool, and silk, a synthetic fiber such as polypropylene, polyester, acetate, triacetate, polyamide, and polyurethane, a biodegradable fiber such as polylactic acid. The material constituting the cloth may be a blended fiber of these fibers. The cloth may be obtained by making the above-exemplified fibers into any form of a woven fabric, a knit fabric, and a non-woven fabric exemplified above. In addition, the texture of the cloth used in this embodiment is not particularly limited, and is equal to or more than 1.0 oz (ounce) and equal to or less than 10.0 oz, preferably equal to or more than 2.0 oz and equal to or less than 9.0 oz, more preferably equal to or more than 3.0 oz and equal to or less than 8.0 oz, and further more preferably equal to or more than 4.0 oz and equal to or less than 7.0 oz. If the texture of the cloth is in such a range, it is possible to perform favorable recording. In addition, the pigment printing ink jet recording method according to this embodiment is applicable to a plurality of kinds of cloths having different textures and it is possible to perform favorable recording.

In this embodiment, the cloth can be a polyester cloth made of polyester or polyester blended yarn. Examples of such a cloth include a polyester cloth, a polyester blended cloth, and the like. Examples of the polyester blended cloth include a cloth in which polyester is blended by equal to or more than 20% by mass, preferably by equal to or more than 50% by mass, and more preferably by equal to or more than 70% by mass, and other blended fibers are not limited and examples thereof include cotton. Such a polyester cloth is excellent from a viewpoint that moisture such as sweat is easily dried, but on the other hand, the ink does not infiltrate therein and deeply falls inside. With respect to this, in this embodiment, as the ink includes a specific amide compound, affinity of the ink with the fiber becomes high, and the ink on the upper layer is easily maintained. As a result, it is possible to obtain excellent color developing properties even in the polyester cloth in which the ink easily sinks downward.

In addition, in this embodiment, the cloth can be a cotton cloth. The cotton cloth has a lot of hydrophilic groups in the fiber, and since the fiber is dense, the ink infiltrates into the cloth and easily spreads. In this embodiment, as the ink includes a specific amide compound, affinity of the ink with the fiber becomes appropriate, spreading of the ink is suppressed, and infiltration of the ink inside the cloth is suppressed. Therefore, the ink stays on an upper layer in the cloth, and excessive spreading of the cloth in a longitudinal direction can be suppressed and color developing properties can be excellent.

5. Pigment Printing Ink Jet Recording Method

Subsequently, the pigment printing ink jet recording method according to this embodiment will be described by each process. The pigment printing ink jet recording method according to this embodiment is a method including a step of ejecting the pigment printing ink jet ink composition according to this embodiment from an ink jet nozzle and attaching the composition onto the cloth.

5. 1. Processing Liquid Composition Attaching Step

In the pigment printing ink jet recording method according to this embodiment, in order to improve color development of a printed matter, it is preferable to have a processing liquid composition attaching step of attaching the processing liquid composition onto the cloth before attaching the ink onto the cloth.

An attachment amount of the processing liquid composition is preferably equal to or more than 0.02 g/cm$^2$ and equal to or less than 0.5 g/cm$^2$, and more preferably equal to or more than 0.02 g/cm$^2$ and equal to or less than 0.24 g/cm$^2$, for example. As the attachment amount of the processing liquid composition is within the range, it is easy to uniformly apply the processing liquid composition to the cloth, and it is possible to suppress aggregation irregularity of an image and to enhance color development.

In addition, in the processing liquid composition attaching step, in a case where the processing liquid composition includes a polyvalent metal salt, an attachment amount of the polyvalent metal salt included in the processing liquid composition attached onto the cloth is preferably equal to or more than 1.6 μmol/cm$^2$ and equal to or less than 6 μmol/cm$^2$, and more preferably equal to or more than 2 μmol/cm$^2$ and equal to or less than 5 μmol/cm$^2$. As the attachment amount of the polyvalent metal salt is equal to or more than 1.6 μmol/cm$^2$, color developing properties of the recorded image become favorable. In addition, as the attachment amount of the polyvalent metal salt is equal to or less than 6 μmol/cm$^2$, color developing properties and friction fastness of the recorded image become favorable.

Examples of the method of attaching the processing liquid composition onto the cloth include a method of immersing a cloth in a processing liquid composition (immersion application), a method of applying a processing liquid composition with a roll cutter and the like (roller application), a method of emitting a processing liquid composition using a spray device and the like (spray application), a method of emitting a processing liquid composition by an ink jet method (ink jet application), and the like, and any of the method may be used. Here, in a case of performing ink jet printing using the printer 1 shown in FIGURE, it is preferable that the processing liquid composition be attached onto the cloth M by ink jet application from the ink jet head 2. If the processing liquid composition attaching step is performed by ink jet application, it is possible to further uniformly attach the processing liquid composition onto the cloth M.

The pigment printing ink jet recording method according to this embodiment may include a processing liquid composition drying step of drying the processing liquid composition attached onto the cloth after the processing liquid composition attaching step. The drying of the processing liquid composition may be performed by natural drying, and from a viewpoint of improving a drying speed, drying is preferably performed in accordance with heating. In a case where the drying step of the processing liquid composition is performed in accordance with heating, the heating method is not particularly limited, and examples thereof include a heat press method, an atmospheric steam method, a high-pressure steam method, a thermofix method, and the like. In addition, examples of the heat source of heating include infrared rays (lamp).

5. 2. Ink Composition Attaching Step

An ink composition attaching step is a step in which the pigment printing ink jet ink composition according to this embodiment is ejected from an ink jet nozzle and attached to at least a region in which the processing liquid composition is attached by the processing liquid composition attaching step, so as to attach the composition onto the cloth. By the ink composition attaching step, an image excellent in color developing properties is obtained.

When the pigment printing ink jet ink composition is attached onto the cloth, the ink may be attached such that at least a portion of the region in which a processing liquid is attached overlaps. Specifically, the ink is preferably attached such that 50% or more of the region in which at least the processing liquid is attached overlaps, more preferably attached such that 60% or more of the region overlaps, and further more preferably attached such that 70% or more of the region overlaps. By attaching the ink in such a manner, it is possible to obtain an image more excellent in color developing properties.

In the ink composition attaching step, a lower limit of an attachment amount of the pigment printing ink composition to the cloth is preferably equal to or more than 10 mg/inch$^2$, more preferably equal to or more than 50 mg/inch$^2$, and further more preferably equal to or more than 80 mg/inch$^2$. An upper limit thereof is preferably equal to or less than 200 mg/inch$^2$, more preferably equal to or less than 150 mg/inch$^2$, and further more preferably 100 mg/inch$^2$. As the attachment amount of the ink composition is within the range, an image excellent in color developing properties is easily prepared, and the drying speed also can become favorable.

5. 3. Heating Step

The pigment printing ink jet recording method according to this embodiment preferably includes a step of heating the cloth during the ink composition attaching step. If the cloth is heated during the ink composition attaching step, a temperature of the ink is increased, the viscosity and the surface tension are decreased, and thereby the ink easily uniformly spreads to the cloth and easily permeates. In addition, in this embodiment, since permeation of the ink is controlled by the specific amide compound included in the ink composition, the ink appropriately uniformly spreads on the cloth surface. With this, the ink is easily fixed to the cloth, and the obtained recorded matter comes to have improved color developing properties and leveling properties as well as excellent friction fastness. In addition, by attaching the ink composition onto the heated cloth, it is possible to improve drying properties of the ink, to shorten the drying time, and to suppress damage to the cloth.

Examples of the heating method of heating the ink composition imparted to the cloth include a heating mechanism 6 shown in FIGURE. Examples of the heating mechanism include a heat press method, an atmospheric pressure steam method, a high-pressure steam method, a hot air drying method, a thermofix method, and the like, in addition to the mechanism.

In the heating step, a surface temperature of the heated cloth is equal to or more than 35° C. and equal to or less than 65° C. As the surface temperature of the cloth surface is within the range, damage to the ink jet head or the cloth can be decreased, and the ink easily uniformly spreads onto the cloth and easily permeates. The heating temperature in this heating step is a temperature of the surface of the heated cloth, for example, and can be measured by using a non-contact thermometer (trade name "IT2-80", manufactured by Keyence Corporation), for example. The surface temperature of the heated cloth surface is preferably equal to or more than 40° C., and more preferably equal to or more than 45° C. In addition, an upper limit value of the surface temperature is preferably equal to or less than 60° C., and more preferably equal to or less than 55° C.

In addition, a heating time is not particularly limited as long as the cloth surface is within the temperature range. For example, the heating time can be equal to or more than 5 seconds and equal to or less than 1 minute, and preferably equal to or more than 10 seconds and equal to or less than 30 seconds. As the heating time is within the range, it is possible to sufficiently heat the cloth while reducing damage to the ink jet head or the cloth.

In addition to this heating step, as described using FIGURE, there may be included a step of providing a second heating mechanism downstream the cloth M in a transporting direction and heating or drying the cloth M after the ink composition attaching step. In this case, the second heating mechanism is provided downstream the cloth M in a transporting direction from the heating mechanism 6 of FIGURE. With this, it is possible to improve drying properties of liquid droplets of the ink attached onto the cloth M. As the second heating mechanism, for example, any mechanism described in the heating mechanism 6 such as a dryer can be used.

The heating temperature in this case is not limited thereto, and preferably equal to or more than 100° C. and equal to or less than 200° C. In a case where the cloth is cotton, the heating temperature is preferably equal to or more than 110° C. and equal to or less than 175° C., more preferably equal to or more than 120° C. and equal to or less than 170° C., and further more preferably equal to or more than 120° C. and equal to or less than 165° C., and in a case where the cloth is polyester or polyester-blended yarn, the heating temperature is preferably equal to or more than 100° C. and equal to or less than 170C, more preferably equal to or more than 100° C. and equal to or less than 165° C., and further more preferably equal to or more than 100° C. and equal to or less than 140° C. As the heating temperature is within the range, it is possible to reduce damage to the cloth or to promote filmization of the resin particle included in the ink composition. In addition, the heating time is not limited thereto, but can be equal to or more than 30 seconds and equal to or less than 20 minutes, preferably equal to or more than 2 minutes and equal to or less than 7 minutes, and more preferably equal to or more than 3 minutes and equal to or less than 5 minutes. As the heating time is within the range, it is possible to sufficiently dry the ink while reducing damage to the cloth.

5. 4. Operation/Effect

As described above, according to the pigment printing ink jet recording method according to this embodiment, by using the pigment printing ink jet ink composition according to this embodiment including the specific amide compound, the ink is suppressed from permeating into the cloth with respect to various cloths such as the polyester cloth and the cotton cloth, and thus it is possible to obtain excellent color developing properties. In addition, as the pigment printing ink jet ink composition according to this embodiment includes the specific amide compound, it is possible to obtain clogging resistance at the time of recording. In addition, in a case where a urethane resin is used as the resin particle, it is possible to make friction fastness more favorable.

6. Examples and Comparative Examples

Hereinafter, the invention will be further specifically described using examples, but the invention is not limited to the examples.

6. 1. Preparation of Ink Composition

Each component was put in a container so as to obtain a composition described in Tables 1-1 and 1-2, mixed and stirred for 2 hours using a magnetic stirrer, and sufficiently mixed by performing dispersion treatment using a beads mill filled with zirconia beads having a diameter of 0.3 mm. While stirring for 1 hour, filtration was performed by using a 5-μm membrane filter made of PTFE to obtain each ink composition. The numerical values in Tables 1-1 and 1-2 represent % by mass, and pure water (ion exchange water) was added such that mass of each printing ink jet ink composition becomes 100% by mass. Here, in Tables 1-1 and 1-2, "amide compound content in organic solvent" represents amide compound content ratio (%) in organic solvent.

As the pigment, a pigment made as a pigment dispersing liquid beforehand by the following method was used.

Preparation of Pigment Dispersing Liquid 65 parts of the pigment described in Tables 1-1 and 1-2, 35 parts of Joncryl 611 (trade name: manufactured by BASF Japan) which is a styrene-acrylic acid-based dispersion resin, 1.70 parts of potassium hydroxide, and 250 parts of super pure water purified by an ion exchange method and a reverse osmosis method were mixed with one another, dispersion was performed for 10 hours by using a ball mill made of zirconia beads, coarse particles were removed by filtration using a glass fiber filter GA-100 (trade name: manufactured by Advantec Corporation), and adjustment was performed such that a pigment solid concentration was 15% by mass. The numerical value in Tables 1-1 and 1-2 represents a pigment solid concentration in the ink composition.

TABLE 1-1

|  |  |  | Examples | | | | | | | |
| --- | --- | --- | --- | --- | --- | --- | --- | --- | --- | --- |
|  |  |  | 1 | 2 | 3 | 4 | 5 | 6 | 7 | 8 |
| Pigment |  | Black pigment solid content | 4 |  |  |  | 4 | 4 | 4 | 4 |
|  |  | Cyan pigment solid content |  | 4 |  |  |  |  |  |  |
|  |  | Magenta pigment solid content |  |  | 4 |  |  |  |  |  |
|  |  | Yellow pigment solid content |  |  |  | 4 |  |  |  |  |
| Resin particle |  | Urethane resin emulsion 1 | 5 | 5 | 5 | 5 | 5 | 5 | 5 | 5 |
|  |  | Urethane resin emulsion 2 |  |  |  |  |  |  |  |  |
|  |  | Urethane resin emulsion 3 |  |  |  |  |  |  |  |  |
|  |  | Acrylic resin emulsion |  |  |  |  |  |  |  |  |
| Organic Solvent | Amide Compound | 3-methoxy-N,N-dimethyl propionamide | 20 | 20 | 20 | 20 |  |  |  |  |
|  |  | 3-butoxy-N,N-dimethyl propionamide |  |  |  |  |  | 20 |  |  |
|  |  | 3-ethoxy-N,N-dimethyl propionamide |  |  |  |  | 20 |  |  |  |
|  |  | 3-methoxy-N,N-diethyl propionamide |  |  |  |  |  |  | 20 |  |
|  |  | 3-ethoxy-N,N-diethyl propionamide |  |  |  |  |  |  |  | 20 |
|  | Others | 2-pyrrolidone | 3 | 3 | 3 | 3 | 3 | 3 | 3 | 3 |
|  |  | Diethylene glycol monobutyl ether | 1 | 1 | 1 | 1 | 1 | 1 | 1 | 1 |
|  |  | 1,2-propanediol |  |  |  |  |  |  |  |  |
| Alkali agent |  | Triethanol amine | 0.5 | 0.5 | 0.5 | 0.5 | 0.5 | 0.5 | 0.5 | 0.5 |
| Surfactant |  | Orfin E1010 | 1 | 1 | 1 | 1 | 1 | 1 | 1 | 1 |
| Preservative |  | Proxel XL2 | 0.1 | 0.1 | 0.1 | 0.1 | 0.1 | 0.1 | 0.1 | 0.1 |
| Water |  | Super pure water | Residue | Residue | Residue | Residue | Residue | Residue | Residue | Residue |
| Amide compound amount ratio with respect to resin |  |  | 4.0 | 4.0 | 4.0 | 4.0 | 4.0 | 4.0 | 4.0 | 4.0 |
| Amide compound content in organic solvent |  |  | 83% | 83% | 83% | 83% | 83% | 83% | 83% | 83% |
| Cloth |  |  | PES | PES | PES | PES | PES | PES | PES | PES |
| Color developing properties |  |  | S | S | S | S | A | A | A | A |
| Clogging resistance |  |  | S | S | S | S | S | S | S | S |
| Friction fastness |  |  | AA | AA | AA | AA | AA | AA | AA | AA |

|  |  |  | Examples | | | | | | |
| --- | --- | --- | --- | --- | --- | --- | --- | --- | --- |
|  |  |  | 9 | 10 | 11 | 12 | 13 | 14 | 15 |
| Pigment |  | Black pigment solid content | 4 | 4 | 4 | 4 | 4 | 4 | 4 |
|  |  | Cyan pigment solid content |  |  |  |  |  |  |  |
|  |  | Magenta pigment solid content |  |  |  |  |  |  |  |
|  |  | Yellow pigment solid content |  |  |  |  |  |  |  |
| Resin particle |  | Urethane resin emulsion 1 | 5 | 5 | 5 |  | 5 | 5 | 5 |
|  |  | Urethane resin emulsion 2 |  |  |  |  |  |  |  |
|  |  | Urethane resin emulsion 3 |  |  |  |  |  |  |  |
|  |  | Acrylic resin emulsion |  |  |  | 5 |  |  |  |
| Organic Solvent | Amide Compound | 3-methoxy-N,N-dimethyl propionamide | 10 | 16 | 30 | 20 | 20 | 10 | 16 |
|  |  | 3-butoxy-N,N-dimethyl propionamide |  |  |  |  |  |  |  |
|  |  | 3-ethoxy-N,N-dimethyl propionamide |  |  |  |  |  |  |  |
|  |  | 3-methoxy-N,N-diethyl propionamide |  |  |  |  |  |  |  |
|  |  | 3-ethoxy-N,N-diethyl propionamide |  |  |  |  |  |  |  |
|  | Others | 2-pyrrolidone | 3 | 3 | 3 | 3 | 3 | 3 | 3 |
|  |  | Diethylene glycol monobutyl ether | 1 | 1 | 1 | 1 | 1 | 1 | 1 |
|  |  | 1,2-propanediol |  |  |  |  |  |  |  |
| Alkali agent |  | Triethanol amine | 0.5 | 0.5 | 0.5 | 0.5 | 0.5 | 0.5 | 0.5 |
| Surfactant |  | Orfin E1010 | 1 | 1 | 1 | 1 | 1 | 1 | 1 |
| Preservative |  | Proxel XL2 | 0.1 | 0.1 | 0.1 | 0.1 | 0.1 | 0.1 | 0.1 |
| Water |  | Super pure water | Residue | Residue | Residue | Residue | Residue | Residue | Residue |
| Amide compound amount ratio with respect to resin |  |  | 2.0 | 3.2 | 6.0 | 4.0 | 4.0 | 2.0 | 3.2 |
| Amide compound content in organic solvent |  |  | 71% | 80% | 88% | 83% | 83% | 71% | 80% |
| Cloth |  |  | PES | PES | PES | PES | Cotton | Cotton | Cotton |
| Color developing properties |  |  | A | S | A | S | S | A | S |
| Clogging resistance |  |  | A | S | S | S | S | A | S |
| Friction fastness |  |  | A | AA | S | A | S | AA | S |

TABLE 1-2

| | | | \multicolumn{8}{c}{Examples} |
|---|---|---|---|---|---|---|---|---|---|---|
| | | | 16 | 17 | 18 | 19 | 20 | 21 | 22 | 23 |
| Pigment | | Black pigment solid content | 4 | 4 | 4 | 4 | 4 | 4 | 4 | 4 |
| | | Cyan pigment solid content | | | | | | | | |
| | | Magenta pigment solid content | | | | | | | | |
| | | Yellow pigment solid content | | | | | | | | |
| Resin particle | | Urethane resin emulsion 1 | 5 | 1 | 10 | | | 5 | | |
| | | Urethane resin emulsion 2 | | | | 5 | | | 6 | 3 |
| | | Urethane resin emulsion 3 | | | | | 5 | | | |
| | | Acrylic resin emulsion | | | | | | | | |
| Organic solvent | Amide Compound | 3-methoxy-N,N-dimethyl propionamide | 30 | 20 | 20 | 20 | 20 | 20 | 10 | 10 |
| | | 3-butoxy-N,N-dimethyl propionamide | | | | | | | | |
| | | 3-ethoxy-N,N-dimethyl propionamide | | | | | | | | |
| | | 3-methoxy-N,N-diethyl propionamide | | | | | | | | |
| | | 3-ethoxy-N,N-diethyl propionamide | | | | | | | | |
| | Others | 2-pyrrolidone | 3 | 3 | 3 | 3 | 3 | 3 | | |
| | | Diethylene glycol monobutyl ether | 1 | 1 | 1 | 1 | 1 | 1 | | |
| | | 1,2-propanediol | | | | | | 1 | 20 | 20 |
| Alkali agent | | Triethanol amine | 0.5 | 0.5 | 0.5 | 0.5 | 0.5 | 0.5 | 0.5 | 0.5 |
| Surfactant | | Orfin E1010 | 1 | 1 | 1 | 1 | 1 | 1 | 1 | 1 |
| Preservative | | Proxel XL2 | 0.1 | 0.1 | 0.1 | 0.1 | 0.1 | 0.1 | 0.1 | 0.1 |
| Water | | Super pure water | Residue | Residue | Residue | Residue | Residue | Residue | Residue | Residue |
| Amide compound amount ratio with respect to resin | | | 6.0 | 20.0 | 2.0 | 4.0 | 4.0 | 4.0 | 1.7 | 3.3 |
| Amide compound content in organic solvent | | | 88% | 83% | 83% | 83% | 83% | 80% | 33% | 33% |
| Cloth | | | Cotton | PES | PES | PES | PES | PES | PES | PES |
| Color developing properties | | | A | S | S | S | S | S | A | A |
| Clogging resistance | | | S | S | B | S | S | S | A | S |
| Friction fastness | | | S | B | S | A | A | AA | A | B |

| | | | \multicolumn{3}{c}{Examples} | \multicolumn{4}{c}{Comparative Examples} |
|---|---|---|---|---|---|---|---|---|---|
| | | | 24 | 25 | 26 | 1 | 2 | 3 | 4 |
| Pigment | | Black pigment solid content | 4 | 4 | 4 | 4 | 4 | 4 | 4 |
| | | Cyan pigment solid content | | | | | | | |
| | | Magenta pigment solid content | | | | | | | |
| | | Yellow pigment solid content | | | | | | | |
| Resin particle | | Urethane resin emulsion 1 | | | | 5 | 5 | | |
| | | Urethane resin emulsion 2 | 12 | 12 | 3 | | | 5 | |
| | | Urethane resin emulsion 3 | | | | | | | 5 |
| | | Acrylic resin emulsion | | | | | | | |
| Organic solvent | Amide Compound | 3-methoxy-N,N-dimethyl propionamide | 10 | 20 | 5 | | | | |
| | | 3-butoxy-N,N-dimethyl propionamide | | | | | | | |
| | | 3-ethoxy-N,N-dimethyl propionamide | | | | | | | |
| | | 3-methoxy-N,N-diethyl propionamide | | | | | | | |
| | | 3-ethoxy-N,N-diethyl propionamide | | | | | | | |
| | Others | 2-pyrrolidone | | | | 3 | 3 | 3 | 3 |
| | | Diethylene glycol monobutyl ether | | | | 1 | 1 | 1 | 1 |
| | | 1,2-propanediol | 20 | 20 | 20 | | | | |
| Alkali agent | | Triethanol amine | 0.5 | 0.5 | 0.5 | 0.5 | 0.5 | 0.5 | 0.5 |
| Surfactant | | Orfin E1010 | 1 | 1 | 1 | 1 | 1 | 1 | 1 |
| Preservative | | Proxel XL2 | 0.1 | 0.1 | 0.1 | 0.1 | 0.1 | 0.1 | 0.1 |
| Water | | Super pure water | Residue | Residue | Residue | Residue | Residue | Residue | Residue |
| Amide compound amount ratio with respect to resin | | | 0.8 | 1.7 | 1.7 | 0.0 | 0.0 | 0.0 | 0.0 |
| Amide compound content in organic solvent | | | 33% | 50% | 20% | 0% | 0% | 0% | 0% |
| Cloth | | | PES | PES | PES | PES | Cotton | PES | PES |
| Color developing properties | | | A | S | B | D | C | C | C |
| Clogging resistance | | | B | B | A | B | B | B | B |
| Friction fastness | | | AA | AA | B | AA | AA | A | A |

In Tables 1-1 and 1-2, details of the components described other than compound names are as follows.

Pigment
  Black pigment: Carbon black
  Cyan pigment: C.I. pigment blue 15:3
  Magenta pigment: C.I. pigment red 122
  Yellow pigment: C.I. pigment yellow 74 Resin Particle
  Urethane resin emulsion 1: Takelac WS-5100 (trade name, manufactured by Mitsui Chemicals & SKC Polyurethanes Inc., polycarbonate-based urethane resin including a cross-linking group, the numerical value in the table is a solid content of the urethane resin.)
  Urethane resin emulsion 2: Hydran WLS-213 (trade name, manufactured by DIC Corporation, polycarbonate-based urethane resin not including a cross-linking group, the numerical value in the table is a solid content of the urethane resin.)
  Urethane resin emulsion 3: Takelac WS-4022 (trade name, manufactured by Mitsui Chemicals, polyester-based urethane resin, the numerical value in the table is a solid content of the urethane resin.)
  Acrylic resin emulsion: Vinyblan 2682 (trade name, manufactured by Nissan Chemical Industry Co., Ltd., acrylic resin emulsion, the numerical value in the table is a solid content of the acrylic resin.) Surfactant Orfin E1010 (trade name, manufactured by Nippon Chemical Industries, acetylene glycol-based surfactant) Preservative Proxel XL2 (trade name, manufactured by Avecia Corporation)

6. 2. Preparation of Printed Matter 6. 2. 1. Preparation of Pre-Treatment Liquid 16.0% by mass of calcium nitrate tetrahydrate (Ca: 17%), 2.7% by mass of fixing resin (trade name "Mowinyl 966A", manufactured by Nippon Synthetic Chemical Industry Co., Ltd.) (solid content), and 0.2% by mass of surfactant (trade name "Safinol 486", manufactured by Nissan Chemical Industry Co., Ltd.) were put in a container, ion exchange water was added such that the total mass is 100% by mass, and the resultant product was mixed and stirred by a magnetic stirrer for 2 hours to be sufficiently mixed. While stirring for 1 hour, filtration was performed by using a 5-µm membrane filter made of PTFE to obtain a pre-treatment liquid.

6. 2. 2. Preparation of Printed Matter Pre-Treatment

A pre-treatment liquid was sufficiently included in a sponge roller, the roller was vertically and horizontally rotated 3 to 4 times with respect to the cloth (cotton cloth (Printstar heavyweight (white) 5.6 oz) described in Tables 1-1 and 1-2 or a polyester cloth (glimmer ACTIVE WEAR 3.5 oz Interlock dry T-shirt 001 white)), and the pre-treatment liquid was applied as uniformly as possible. An application amount of the pre-treatment liquid was approximately 20 g per an area of A4 size. The cloth to which the pre-treatment liquid was applied was subjected to heat treatment at 165° C. for 45 seconds by using a heat press and dried.

Preparation of Printed Matter

To a region of the pre-treated dried cloth to which a processing liquid composition was applied, printing was performed with the ink composition described in each example at a resolution of 1440 dpi×1440 dpi and in an application amount of 200 mg/inch$^2$, using a printer (trade name "SC-F200") manufactured by Seiko Epson Corporation. After printing, heat treatment was performed at 165° C. for 5 minutes in a conveyer oven (hot air drying method) and fixation of the printed matter was performed.

6. 3. Evaluation Test

Regarding each ink, evaluation of clogging, friction fastness, and color developing properties was carried out.

6. 3. 1. Evaluation of Clogging Resistance

After preparing a printed matter in 6. 2. 2., clogging of the nozzle was checked, and clogging resistance was evaluated according to the following evaluation criteria.

Evaluation Criteria

S: The number of nozzles showing poor ejection and the number of nozzles of which ejection direction was displaced were equal to or less than 2.

A: The number of nozzles showing poor ejection and the number of nozzles of which ejection direction was displaced were equal to or more than 3 and equal to or less than 5.

B: The number of nozzles showing poor ejection and the number of nozzles of which ejection direction was displaced were equal to or more than 6.

6. 3. 2. Evaluation of Friction Fastness

A test for dyed color fastness against friction of the printed matter in each example was carried out by using a type I (clock meter) tester in accordance with a humidity test based on ISO-105 X12, and evaluation was performed according to the following evaluation criteria using a pollution gray scale.

Evaluation Criteria

S: Friction fastness is 4 level or higher.

AA: Friction fastness is 3 level or 3/4 level.

A: Friction fastness is 2/3 level.

B: Friction fastness is 2 level.

C: Friction fastness is less than 2 level.

6. 3. 3. Evaluation of Color Developing Properties

An OD value of the printed matter obtained in each example was measured using a colorimeter (trade name "Gretag Macbeth Spectrolino", manufactured by X-RITE Corporation), and color developing properties were evaluated based on the obtained OD value, according to the following evaluation criteria.

Evaluation Criteria

S: OD value is equal to or more than 1.45.

A: OD value is equal to or more than 1.40 and less than 1.45.

B: OD value is equal to or more than 1.35 and less than 1.40.

C: OD value is equal to or more than 1.30 and less than 1.35.

D: OD value is less than 1.30.

6. 4. Evaluation Result

The result of the evaluation test is shown in Tables 1-1 and 1-2.

In any of examples, a pigment, a resin particle, an organic solvent including a specific amide compound, and water were included, and color developing properties were excellent. It is considered that as the specific amide compound acts as a resin dissolving solvent, leveling properties of the ink with respect to a recording medium are improved and thus color developing properties are improved. In addition, although not described in the table, since the specific amide compound had a low standard boiling point, as the specific amide compound was included, dryness of the ink after recording became excellent. In addition, in any of the examples, clogging resistance and friction fastness were also excellent.

More specifically, in Examples 1 to 4, when any of the pigments were used, color developing properties were excellent, and clogging resistance and friction fastness were also excellent. In addition, in Examples 1 and 5 to 8, even when the number of carbons of the alkyl groups of the amide compounds were different, in any of the examples, color developing properties were excellent, and clogging resistance and friction fastness were also excellent.

In Examples 1 and 9 to 11, when the content of the amide compound was equal to or more than 16% by mass and equal to or less than 30% by mass, the amide compound acted as a resin dissolving solvent and film formation of the emulsion was delayed, and thus clogging resistance was excellent. This tendency was also the same in the case of Examples 13 to 16 in which cotton was used as the cloth.

In Examples 1 and 12, when the resin particle was a urethane resin, friction fastness was excellent.

In Examples 1, 17, and 18, when the content of the resin particle was high, friction fastness was excellent, but when the content of the resin particle became 10% by mass, clogging resistance deteriorated.

In Examples 1, 19, and 20, color developing properties were great even when different resin particles were used, but in a case where a cross-linking urethane resin was used as the resin particle, there came a result that friction fastness was excellent.

In Examples 1 and 21, when 1,2-propanediol was used as the organic solvent, there came a result that color developing properties, clogging resistance, and friction fastness were excellent.

In Examples 19 and 22 to 26, when the content of the specific amide compound was equal to or more than 1.5 at a mass ratio with respect to the resin particle, clogging resistance was favorable, and in particular, in a case where the content of the specific amide compound was equal to or more than 3.2, clogging resistance was excellent. In addition, when the content of the specific amide compound was high with respect to a total mass of the organic solvent, color developing properties were excellent.

Contrary to the examples, in any of Comparative Examples 1 to 4 departing from the scope of the invention, there came a result that color developing properties were poor. More specifically, in Comparative Examples 1 and 2 in which the specific amide compound was not included, when printing was performed on any of PES and cotton, color developing properties were similarly low, and the resin particle caused clogging of the nozzles, and thus the nozzles showing unfavorable ejection were found. Also in Comparative Examples 3 and 4 in which the specific amide compound was not included and resin particles different from that of Comparative Example 1 were included, there came a result that color developing properties were low.

As described above, as the ink of the examples include a pigment, a resin particle, a specific amide compound, and water, color developing properties were favorable in any of the polyester cloth and the cotton cloth, and as the content of the specific amide compound or the content of the resin particle was within an appropriate range, clogging resistance and friction fastness also became excellent.

The invention is not limited to the embodiments, and various modifications are possible. For example, the invention includes substantially the same configurations (for example, configurations of which functions, methods, and the results are the same, or configurations of the object and the effect are the same) as the configurations described in the embodiment. In addition, the invention includes configurations in which non-essential parts of the configuration described in the embodiment are substituted. In addition, the invention includes configurations that exhibit the same operations and effects of the configuration described in the embodiment, or configurations with which the same object can be achieved. In addition, the invention includes configurations obtained by adding a known technology to the configuration described in the embodiment.

The entire disclosure of Japanese Patent Application No. 2018-057899, filed Mar. 26, 2018 is expressly incorporated by reference herein.

What is claimed is:

1. A pigment printing ink jet ink composition comprising:
a pigment;
a resin particle;
an organic solvent; and
water,
wherein the organic solvent includes an amide compound represented by the following general formula (1),

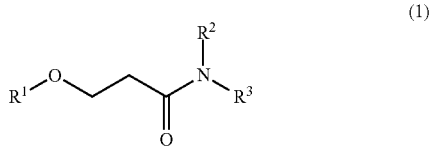

(1)

in the general formula (1), $R^1$ represents a straight chain or branched alkyl group having 1 to 6 carbon atoms, and $R^2$ and $R^3$ each independently represent hydrogen atoms or a straight chain or branched alkyl group having 1 to 4 carbon atoms, and the resin particle is a polycarbonate-based urethane resin particle having a cross-linking group that is a blocked isocyanate group obtained by blocking an isocyanate group with a chemical blocking agent selected from the group consisting of an imidazole-based compound, an imidazoline-based compound, a pyrimidine-based compound, a guanidine-based compound, an alcohol-based compound, a phenol-based compound, an active methylene-based compound, an amine-based compound, an imine-based compound, an oxime-based compound, a carbamic acid-based compound, a urea-based compound, an acid amide-based compound, an acid imide-based compound, a triazole-based compound, a pyrazole-based compound, a mercaptan-based compound, and bisulfate.

2. The pigment printing ink jet ink composition according to claim 1, wherein a content of the amide compound represented by the general formula (1) is equal to or more than 80% by mass with respect to a total mass of the organic solvent.

3. The pigment printing ink jet ink composition according to claim 1, which is used in printing onto a polyester cloth.

4. The pigment printing ink jet ink composition according to claim 1, wherein a content of the amide compound represented by the general formula (1) is equal to or more than 16% by mass and equal to or less than 30% by mass with respect to a total mass of the pigment printing ink jet ink composition.

5. The pigment printing ink jet ink composition according to claim 1, wherein a content of the amide compound represented by the general formula (1) is equal to or more than 1.5 at a mass ratio with respect to the resin particle.

6. A pigment printing ink jet recording method comprising:
ejecting the pigment printing ink jet ink composition according to claim 1 from an ink jet nozzle and attaching the pigment printing ink jet ink composition onto a cloth.

7. A pigment printing ink jet recording method comprising:
ejecting the pigment printing ink jet ink composition according to claim 2 from an ink jet nozzle and attaching the pigment printing ink jet ink composition onto a cloth.

8. A pigment printing ink jet recording method comprising:
ejecting the pigment printing ink jet ink composition according to claim 3 from an ink jet nozzle and attaching the pigment printing ink jet ink composition onto a cloth.

9. A pigment printing ink jet recording method comprising:
ejecting the pigment printing ink jet ink composition according to claim 4 from an ink jet nozzle and attaching the pigment printing ink jet ink composition onto a cloth.

10. A pigment printing ink jet recording method comprising:
ejecting the pigment printing ink jet ink composition according to claim 5 from an ink jet nozzle and attaching the pigment printing ink jet ink composition onto a cloth.

* * * * *